US012640357B2

(12) United States Patent
Liu et al.

(10) Patent No.: US 12,640,357 B2

(45) Date of Patent: May 26, 2026

(54) SYSTEMS AND METHODS FOR CONTROLLING FLOW THROUGH AN OPEN PORT INTERFACE

(71) Applicant: DH Technologies Development Pte. Ltd., Singapore (SG)

(72) Inventors: Chang Liu, Richmond Hill (CA); Thomas Covey, Newmarket (CA); Peter Kovarik, Concord (CA)

(73) Assignee: DH Technologies Development Pte. Ltd., Singapore (SG)

( * ) Notice: Subject to any disclaimer, the term of this patent is extended or adjusted under 35 U.S.C. 154(b) by 537 days.

(21) Appl. No.: 18/257,611

(22) PCT Filed: Dec. 21, 2021

(86) PCT No.: PCT/IB2021/062108

§ 371 (c)(1),
(2) Date: Jun. 15, 2023

(87) PCT Pub. No.: WO2022/137120

PCT Pub. Date: Jun. 30, 2022

(65) Prior Publication Data

US 2024/0112901 A1 Apr. 4, 2024

Related U.S. Application Data

(60) Provisional application No. 63/186,929, filed on May 11, 2021, provisional application No. 63/128,572, filed on Dec. 21, 2020.

(51) Int. Cl.
*H01J 49/06* (2006.01)
*H01J 49/16* (2006.01)

(52) U.S. Cl.
CPC .......... *H01J 49/068* (2013.01); *H01J 49/165* (2013.01)

(58) Field of Classification Search
CPC ..... H01J 49/068; H01J 49/165; H01J 49/0431
(Continued)

(56) References Cited

U.S. PATENT DOCUMENTS 5,109,840 A 5/1992 Daleiden
5,691,205 A 11/1997 Kawabata et al.
(Continued)

FOREIGN PATENT DOCUMENTS

CN 102354649 A 2/2012
CN 109844901 A 6/2019
(Continued)

OTHER PUBLICATIONS

Zhang, et al.("Acoustic Ejection Mass Spectrometry for High-Throughput Analysis," bioRxiv, Jan. 29, 2020 (Year: 2020).*
(Continued)

*Primary Examiner* — Michael Maskell
(74) *Attorney, Agent, or Firm* — Merchant & Gould P.C.

(57) ABSTRACT

A method of adjusting a position of an electrode within a nebulizer probe of a mass spectrometry device having an open port interface for receiving a sample includes performing a first analysis of the sample at a first analysis condition including a first position of the electrode and a first flow rate. After performing the first analysis, a second analysis of the sample is performed at a second analysis condition including the first position of the electrode and a second flow rate higher than the first flow rate. Thereafter, a third analysis of the sample is performed at a third analysis condition including a second position of the electrode and the second flow rate.

21 Claims, 15 Drawing Sheets

(58) Field of Classification Search
USPC .......................................... 250/281, 282, 288
See application file for complete search history.

(56) References Cited

U.S. PATENT DOCUMENTS

| | | | |
|---|---|---|---|
| 7,923,681 | B2 | 4/2011 | Collings et al. |
| 8,759,753 | B1 | 6/2014 | Di Bussolo |
| 9,134,335 | B2 | 9/2015 | Dehmer |
| 10,770,277 | B2 | 9/2020 | Datwani et al. |
| 11,232,938 | B2 | 1/2022 | Arnold et al. |
| 2002/0048536 | A1 | 4/2002 | Bergh et al. |
| 2003/0193020 | A1 | 10/2003 | Van Berkel |
| 2004/0102742 | A1 | 5/2004 | Tuyl |
| 2012/0053065 | A1 | 3/2012 | Van Berkel |
| 2012/0079894 | A1 | 4/2012 | Van Berkel et al. |
| 2012/0083045 | A1 | 4/2012 | Van Berkel et al. |
| 2013/0023005 | A1 | 1/2013 | Chen et al. |
| 2013/0092166 | A1 | 4/2013 | Pearce |
| 2013/0118498 | A1 | 5/2013 | Robitaille et al. |
| 2013/0294971 | A1 | 11/2013 | Van Berkel et al. |
| 2014/0216177 | A1 | 8/2014 | Van Berkel et al. |
| 2014/0283627 | A1 | 9/2014 | Hattingh et al. |
| 2015/0318160 | A1 | 11/2015 | Pawliszyn et al. |
| 2016/0266017 | A1 | 9/2016 | Kennedy et al. |
| 2017/0316926 | A1 | 11/2017 | Arnold et al. |
| 2018/0021533 | A1 | 1/2018 | Gausche-Hill et al. |
| 2019/0072464 | A1 | 3/2019 | Wiederin |
| 2019/0157061 | A1 | 5/2019 | Datwani et al. |
| 2020/0043712 | A1 | 2/2020 | Arnold et al. |
| 2020/0166490 | A1 | 5/2020 | Wiechers |
| 2020/0345968 | A1 | 11/2020 | Merrell et al. |
| 2020/0365382 | A1 | 11/2020 | Arnold et al. |
| 2021/0121905 | A1 | 4/2021 | Covey |
| 2021/0190735 | A1 | 6/2021 | Bonda |
| 2023/0184642 | A1 | 6/2023 | Liu |
| 2023/0280351 | A1 | 9/2023 | Iannotti |
| 2023/0349858 | A1 | 11/2023 | Covey |
| 2024/0079225 | A1 | 3/2024 | Covey |
| 2024/0096611 | A1 | 3/2024 | Covey |
| 2024/0159716 | A1 | 5/2024 | Cox |
| 2024/0170270 | A1 | 5/2024 | Kovarik |
| 2024/0170271 | A1 | 5/2024 | Kovarik |
| 2024/0175787 | A1 | 5/2024 | Tate |
| 2024/0272191 | A1 | 8/2024 | Verma |

FOREIGN PATENT DOCUMENTS

| | | | |
|---|---|---|---|
| EP | 0421007 | | 4/1991 |
| EP | 2443432 | | 4/2012 |
| JP | 2011007690 | A | 1/2011 |
| JP | 2012-502296 | A | 1/2012 |
| JP | 2019-521320 | A | 7/2019 |
| WO | 2010/048339 | | 12/2010 |
| WO | 2011/146269 | | 11/2011 |
| WO | 2012/149314 | | 11/2012 |
| WO | 2013/112914 | | 8/2013 |
| WO | 2014/140776 | | 9/2014 |
| WO | 2015/108807 | | 7/2015 |
| WO | 2015/188282 | | 12/2015 |
| WO | 2016/164766 | | 10/2016 |
| WO | 2018/217778 | | 11/2018 |
| WO | 2019/102350 | | 5/2019 |
| WO | 2019/126363 | | 6/2019 |
| WO | 2020/016809 | | 1/2020 |
| WO | 2020/079647 | | 4/2020 |
| WO | 2021/234644 | | 11/2021 |
| WO | 2022/167917 | | 8/2022 |
| WO | 2022/167980 | | 8/2022 |
| WO | 2022/172156 | | 8/2022 |
| WO | 2022/172199 | | 8/2022 |
| WO | 2022/201037 | | 9/2022 |
| WO | 2022/208393 | | 10/2022 |
| WO | 2022/259187 | | 12/2022 |
| WO | 2024/241262 | | 11/2024 |

OTHER PUBLICATIONS

Anonymous, "Turbo V Ion Source Operator Guide", AB Sciex Pte, Ltd., Aug. 1, 2015, retrieved from the internet on Mar. 17, 2022 at: https://manualzz.com/doc/7476753/user-guide--turbo-v-ion-source-operator-guide, "TurbolonSpray Probe Optimization", and "Adjust the Electrode Tip Extension", 52 pages.

Bonvin, Gregoire et al., "Capillary electrophoresis; electrospray ionization-mass spectrometry interfaces: Fundamental concepts and technical developments", Journarl of Chromatopgraphy A, vol. 1267, Dec. 1, 2012, pp. 17-31.

Dirico, Kenneth et al., "Ultra-High-Throughput Acoustic Sroplet Ejection-Open Port Interface-Mass Spectrometry for Parallel Medicinal Chemistry", ACS Medicinal Chemistry Letters, vol. 11, No. 6, May 1, 2020, pp. 1101-1110.

Hager, James et al., "Product ion scanning using Q-q-Q linear ion trap (Q Trap) mass spectrometer", Rapid Communications in Mass Spectrometry, 2003; 17: 1056-1064.

Liu, Chang et al., "Operational Modes and Speed Considerations of an Acoustic Droplet Dispenser for Mass Sectrometry", Analytical Chemistry, vol. 92, No. 24, Oct. 16, 2020, pp. 15818-15826.

Maxwell, E. Jane et al., "Decoupling CE and ESI for a more robust interface with MS", Electrophoresis, Verlag-Chemie, Hoboken, USA, vol. 31, No. 7, Mar. 1, 2010, pp. 1130-1137.

PCT International Preliminary Report on Patentability in Application PCT/IB2021/062108, mailed Jun. 29, 2023, 11 pages.

PCT International Search Report and Written Opinion in Application PCT/IB2021/062108, mailed Mar. 29, 2022, 19 pages.

Pei, Jian et al., "Analysis of Samples Stored as Individual Plugs in a Capilaary by Electrspray Ionization Mass Spectrometry", Analytical Chemistry, vol. 81, No. 15, Aug. 1, 2009, pp. 6558-6561.

Pei, Jian et al., "Rapid and Label-Free Screening of Enzyme Inhibitors Using Segmented Flow Electrospray Ionization Mass Spectrometry", Journal of the American Society for Mass Spectrometry, Elsevier, vol. 21, No. 7, Jul. 1, 2010, pp. 1107-1113.

SCIEX, Echo MS Core Module User Guide, published by SCIEX, RUO-IDV-05-9945-C, Apr. 2020, 51 pages.

Simon, Roman et al., "Acoustic Ejection Mass Spectrometry: A Fully Automatable Technology for High-Throughput Screening in Drug Discovery", Society for Laboratory Automation and Screening, vol. 26, Jul. 26, 2021, pp. 961-973.

Tascon, Marcos et al., "Development of a microfluidic open interface with flow isolated desorption volume for the direct coupling of SPME devices to mass spectrometry", Analytical Chemistry, vol. 90, No. 4, Feb. 1, 2018, pp. 2631-2638.

Van Berkel et al., Immediate drop on demand technology (I-DOT) coupled with mass spectrometry via an open-port sampling interface, Bioanalysis, vol. 9, No. 21, Nov. 2, 2017, pp. 1667-1679.

Van Berkel, Gary et al., "An open port sampling interface for liquid introduction atmosperic pressure ionization mass spectrometry: Open port sampling interface", Rapid Communications in Mass Spectrometry, vol. 29, No. 19, Oct. 15, 2015, pp. 1749-1756.

Van Berkel, Gary et al., "Combined Falling Drop/Open Port Sampling Interface System for Automated Flow Injection Mass Spectrometry", Analytic Chemistry, 2017, 89, 22, pp. 12578-12586.

Wen, Xiujuan et al., "Direct Analysis from Phase-Separated Liquid Samples using ADE-OPI-MS: Applicability to High-Throughput Screening for Inhibitors of Diacylglycerol Acyltransferase 2", Analytic Chemistry, 2021, 93, 15, 6071-6079.

Zhang, Hui et al., "Acoustic Ejection Mass Spectrometry for High-Throughput Analsis", bioRxiv, Jan. 29, 2020, retrieved from the internet on Sep. 8, 2021 at: https:www.biorxiv.org/content/10.1101/2020.01.28.923938v1.full.pdf, 32 pages.

Zhang, Hui et al., "Acoustic Ejection Mass Spectrometry for High-Throughput Analysis", Analytical Chemistry, Jan. 29, 2020, 12 pages.

Li, Xianjiang et al., "Sampling and analyte enrichment strategies for ambient mass spectrometry", Anal Bioanal Chem (2018), 410:715-724.

Li, Xin-Xin, et al., "Method for Improving Spatial Resolution of Liquid-assisted Surface Desorption Atmospheric Pressure Chemical

(56) References Cited

OTHER PUBLICATIONS

Ionization Mass Spectrometry", Chinese Journal of Analytical Chemistry, vol. 44, Issue 1, Jan. 2016, pp. 25-31.

* cited by examiner

SYSTEMS AND METHODS FOR CONTROLLING FLOW THROUGH AN OPEN PORT INTERFACE

CROSS-REFERENCE TO RELATED APPLICATIONS

This application is a National Stage Application of PCT/IB2021/062108, filed on Dec. 21, 2021, which claims the benefit of U.S. Provisional Application No. 63/128,572, filed on Dec. 21, 2020 and U.S. Provisional Application No. 63/186,929, filed on May 11, 2021, the entire disclosures of which are incorporated by reference in their entireties. To the extent appropriate, a claim of priority is made to each of the above disclosed applications.

BACKGROUND

High-throughput sample analysis is critical to the drug discovery process. Mass spectrometry (MS) based methods can achieve label-free, universal mass detection of a wide range of analytes with exceptional sensitivity, selectivity, and specificity. As a result, there is significant interest in improving the throughput of MS-based analysis for drug discovery. In particular, a number of sample introduction systems for MS-based analysis have been improved to provide higher throughput.

Acoustic droplet ejection (ADE) has been combined with an open port interface (OPI) to provide a sample introduction system for high-throughput mass spectrometry. When an ADE device and OPI are coupled to a mass spectrometer, the system can be referred to as an acoustic ejection mass spectrometry (AEMS) system.

The analytical performance (sensitivity, reproducibility, throughput, etc.) of an AEMS system depends on the performance of the ADE device and the OPI. The performance of the ADE device and the OPI depends on selecting the operational conditions or parameters for these devices.

SUMMARY

The technologies described herein balance the flow rate of transport liquid at the OPI with the Venturi aspiration force generated by the high-flow nebulizer gas at an electrospray ionization (ESI) source of a mass spectrometry device. The generated Venturi aspiration force draws the transport fluid and sample from the OPI to the ESI. The position of the electrode relative to the nebulizer probe (e.g., the projection beyond the tip of the probe) affects the negative pressure generated at the ESI that draws the transport liquid from the OPI. A balanced system produces sufficient aspiration force at the ESI so as to properly draw the transport liquid from the OPI. The technologies described herein allow the maximum flow rate of transport liquid to be delivered to the OPI while still producing measurable, reproducible results at the detector due to proper positioning of the electrode of the ESI.

In one aspect, the technology relates to a method of adjusting a position of an electrode within a nebulizer probe of a mass spectrometry device having an open port interface for receiving a sample, the method including: performing a first analysis of the sample at a first analysis condition comprising a first position of the electrode in the nebulizer probe and a first flow rate, wherein performing the first analysis includes: delivering a transport liquid to the open port interface at the first flow rate while ejecting the sample from the electrode in the first position; and analyzing the sample at the first analysis condition with the mass spectrometry device to obtain a first analysis condition ion intensity signal; after performing the first analysis, performing a second analysis of the sample at a second analysis condition comprising the first position of the electrode in the nebulizer probe and a second flow rate higher than the first flow rate, wherein performing the second analysis includes: delivering the transport liquid to the open port interface at the second flow rate while ejecting the sample from the electrode in the first position; and analyzing the sample at the second analysis condition with the mass spectrometry device to obtain a second analysis condition ion intensity signal; and after performing the second analysis, performing a third analysis of the sample at a third analysis condition comprising a second position of the electrode in the nebulizer probe and the second flow rate, wherein performing the third analysis includes: delivering the transport liquid to the open port interface at the second flow rate while ejecting the sample from the electrode in the second position. In an example, performing the first analysis further includes displaying the first analysis condition ion intensity signal, and wherein performing a second analysis further includes displaying the second analysis condition ion intensity signal. In another example, performing the third analysis further includes analyzing the sample at the third analysis condition with the mass spectrometry device to obtain a third analysis condition ion intensity signal. In yet another example, performing the third analysis further comprises displaying the third analysis condition ion intensity signal. In still another example, the first analysis condition ion intensity signal is characterized by at least one of a peak height, a peak width, a baseline between at least two adjacent peaks, a peak-to-peak variation, and a peak shape.

In another example of the above aspect, the method further includes: detecting a deviation by a first predetermined threshold between the first analysis condition ion intensity signal and the second analysis condition ion intensity signal; and sending an electrode adjustment signal based at least in part on the deviation. In an example, sending the electrode adjustment signal includes: initiating an adjustment of the position of the electrode within the nebulizer probe; detecting a reduced deviation of less than the first predetermined threshold between the first analysis condition ion intensity signal and the second analysis condition ion intensity signal; and terminating adjustment of the position of the electrode within the nebulizer probe based at least in part on the detection of the reduced deviation, wherein the position of the electrode within the nebulizer probe at the termination of adjustment of the position of the electrode is the second position. In another example, sending the electrode adjustment signal includes emitting at least one of a visual signal and an audible signal.

In another aspect, the technology relates to a method of adjusting a position of an electrode within a nebulizer probe of a mass spectrometry device having an open port interface for receiving a transport liquid, the method including: delivering a transport liquid to the open port interface at a first flow rate while ejecting the transport liquid from the electrode in a first position relative to the nebulizer probe; analyzing the ejected transport liquid with the mass spectrometry device to generate an analysis signal including a test compound intensity signal and an associated noise; after generation of the test compound intensity signal, delivering the transport liquid to the open port interface at the first flow rate while ejecting the transport liquid from the electrode in a second position relative to the nebulizer probe, wherein delivering the transport liquid to the open port interface at the first flow rate substantially eliminates the noise from the test compound intensity signal. In an example, the method further includes: after substantially eliminating the noise from the analysis signal, delivering the transport liquid to the open port interface at a higher second flow rate while ejecting the transport liquid from the electrode in the second position relative to the nebulizer probe, wherein delivering the transport liquid to the open port interface at the second flow rate introduces noise to the analysis signal; and after generation of the test compound intensity signal, delivering the transport liquid to the open port interface at the second flow rate while ejecting the transport liquid from the electrode in a third position relative to the nebulizer probe, wherein delivering the transport liquid to the open port interface at the second flow rate substantially eliminates the noise from the test compound intensity signal. In another example, the test compound intensity signal is characterized by at least one of an intensity, a noise, a signal event periodicity, and a signal event duration. In yet another example, the method includes detecting a deviation by a first predetermined threshold between the test compound intensity signal and the noise. In still another example, the method includes sending an electrode adjustment signal based at least in part on the detection.

In another example of the above aspect, sending the electrode adjustment signal initiates an adjustment of a position of the electrode within the nebulizer probe. In another example, sending the electrode adjustment signal includes emitting at least one of a visual signal and an audible signal. In another example, when in the first position, an indexing feature on the nebulizer probe is in a first positioning configuration and when in the second position, the indexing feature on the nebulizer probe is in a second positioning configuration.

In another aspect, the technology relates to a mass analysis instrument including: an open port interface (OPI) configured to receive a sample; a liquid pump configured to pump a transport liquid into the OPI; an electrospray ionization (ESI) source, in liquid communication with the OPI, including an electrode within a nebulizer probe, wherein the electrode is movably positionable within the probe; a detector configured to detect ions emitted from the ESI source; a processor; and memory storing instructions that when executed by the processor cause the mass analysis instrument to perform a set of operations including: pumping the transport liquid into the OPI at a first flow rate; during pumping at the first flow rate, with the electrode positioned at a first position, ejecting at least one of the transport liquid and the sample through the ESI source to be analyzed by the detector; analyzing the ejected at least one of the transport liquid and the sample to obtain a ion intensity signal; displaying the ion intensity signal; receiving an input from a user; and based at least in part on the input, performing at least one of: pumping the transport liquid into the OPI at a second flow rate while ejecting at least one of the transport liquid and the sample through the ESI source with the electrode in the first position; and pumping the transport liquid into the OPI at the first flow rate while ejecting at least one of the transport liquid and the sample through the ESI source with the electrode in a second position. In an example, the ion intensity signal is associated with the sample. In another example, the ion intensity signal is associated with the transport liquid. In yet another example, the mass analysis instrument further including a transport liquid source and test liquid interface communicatively coupled to the transport liquid source. In still another example, the set of operations further includes introducing the sample to the transport liquid.

DETAILED DESCRIPTION

Figure 1:
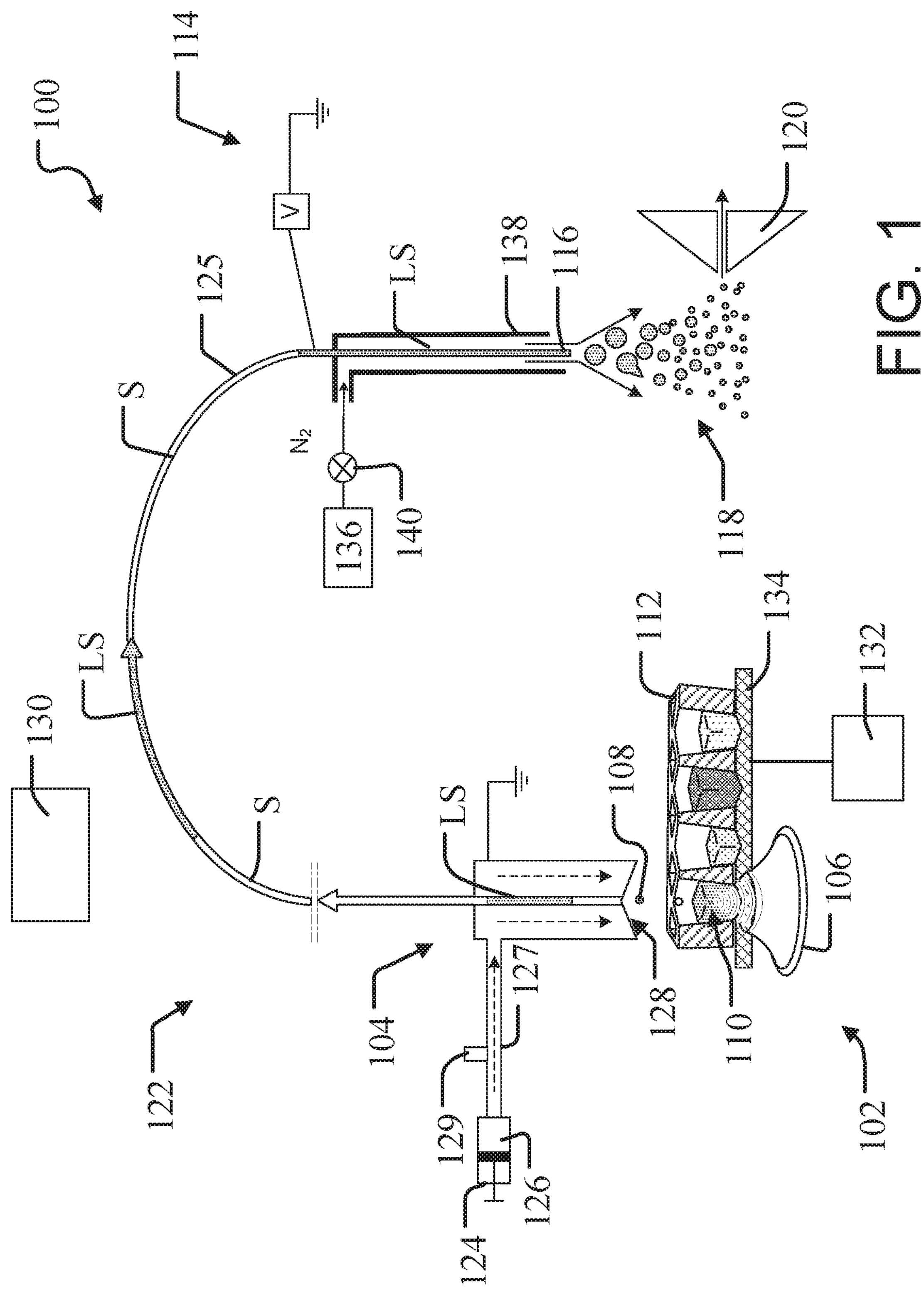
FIG. 1 is a schematic view of an example system combining acoustic droplet ejection (ADE) with an open port interface (OPI) sampling interface and electrospray ionization (ESI) source.

FIG. 1 is a schematic view of an example system 100 combining an ADE 102 with an OPI sampling interface 104 and ESI source 114. The system 100 may be a mass analysis instrument such as a mass spectrometry device that is for ionizing and mass analyzing analytes received within an open end of a sampling OPI. Such a system 100 is described, for example, in U.S. Pat. No. 10,770,277, the disclosure of which is incorporated by reference herein in its entirety. The ADE 102 includes an acoustic ejector 106 that is configured to eject a droplet 108 from a reservoir 112 into the open end of sampling OPI 104. As shown in FIG. 1, the example system 100 generally includes the sampling OPI 104 in liquid communication with the ESI source 114 for discharging a liquid containing one or more sample analytes (e.g., via electrospray electrode 116) into an ionization chamber 118, and a mass analyzer detector (depicted generally at 120) in communication with the ionization chamber 118 for downstream processing and/or detection of ions generated by the ESI source 114. Due to the configuration of the nebulizer probe 138 and electrospray electrode 116 of the ESI source 114, samples ejected therefrom are transformed into the gas phase. A liquid handling system 122 (e.g., including one or more pumps 124 and one or more conduits 125) provides for the flow of liquid from a solvent reservoir 126 to the sampling OPI 104 and from the sampling OPI 104 to the ESI source 114. The solvent reservoir 126 (e.g., containing a liquid, desorption solvent) can be liquidly coupled to the sampling OPI 104 via a supply conduit 127 through which the liquid can be delivered at a selected volumetric rate by the pump 124 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. A test liquid interface 129, relevant to certain methods described herein, is also depicted coupled to the supply conduit 127. As discussed in detail below, the flow of liquid into and out of the sampling OPI 104 occurs within a sample space accessible at the open end such that one or more droplets 108 can be introduced into the liquid boundary 128 at the sample tip and subsequently delivered to the ESI source 114.

The system 100 includes an ADE 102 that is configured to generate acoustic energy that is applied to a liquid contained within a reservoir 110 that causes one or more droplets 108 to be ejected from the reservoir 110 into the open end of the sampling OPI 104. A controller 130 can be operatively coupled to the ADE 102 and can be configured to operate any aspect of the ADE 102 (e.g., focusing structures, acoustic ejector 106, automation elements 132 for moving a movable stage 134 so as to position a reservoir 110 into alignment with the acoustic ejector 106, etc.). This enables the ADE 106 to inject droplets 108 into the sampling OPI 104 as otherwise discussed herein substantially continuously or for selected portions of an experimental protocol by way of non-limiting example. Controller 130 can be, but is not limited to, a microcontroller, a computer, a microprocessor, or any device capable of sending and receiving control signals and data. Wired or wireless connections between the controller 130 and the remaining elements of the system 100 are not depicted but would be apparent to a person of skill in the art.

As shown in FIG. 1, the ESI source 114 can include a source 136 of pressurized gas (e.g. nitrogen, air, or a noble gas) that supplies a high velocity nebulizing gas flow to the nebulizer probe 138 that surrounds the outlet end of the electrospray electrode 116. As depicted, the electrospray electrode 116 protrudes from a distal end of the nebulizer probe 138. The pressured gas interacts with the liquid discharged from the electrospray electrode 116 to enhance the formation of the sample plume and the ion release within the plume for sampling by mass analyzer detector 120, e.g., via the interaction of the high speed nebulizing flow and jet of liquid sample (e.g., analyte-solvent dilution). The liquid discharged may include discrete volumes of liquid samples LS received from each reservoir 110 of the well plate 112. The discrete volumes of liquid samples LS are typically separated from each other by volumes of the solvent S (hence, as flow of the solvent moves the liquid samples LS from the OPI 104 to the ESI source 114, the solvent may also be referred to herein as a transport liquid). The nebulizer gas can be supplied at a variety of flow rates, for example, in a range from about 0.1 L/min to about 20 L/min, which can also be controlled under the influence of controller 130 (e.g., via opening and/or closing valve 140).

It will be appreciated that the flow rate of the nebulizer gas can be adjusted (e.g., under the influence of controller 130) such that the flow rate of liquid within the sampling OPI 104 can be adjusted based, for example, on suction/aspiration force generated by the interaction of the nebulizer gas and the analyte-solvent dilution as it is being discharged from the electrospray electrode 116 (e.g., due to the Venturi effect). The ionization chamber 118 can be maintained at atmospheric pressure, though in some examples, the ionization chamber 118 can be evacuated to a pressure lower than atmospheric pressure.

It will also be appreciated by a person skilled in the art and in light of the teachings herein that the mass analyzer detector 120 can have a variety of configurations. Generally, the mass analyzer detector 120 is configured to process (e.g., filter, sort, dissociate, detect, etc.) sample ions generated by the ESI source 114. By way of non-limiting example, the mass analyzer detector 120 can be a triple quadrupole mass spectrometer, or any other mass analyzer known in the art and modified in accordance with the teachings herein. Other non-limiting, exemplary mass spectrometer systems that can be modified in accordance with various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 17: 1056-1064); and U.S. Pat. No. 7,923,681, entitled "Collision Cell for Mass Spectrometer," the disclosures of which are hereby incorporated by reference herein in their entireties.

Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 100 including, for example, an ion mobility spectrometer (e.g., a differential mobility spectrometer) that is disposed between the ionization chamber 118 and the mass analyzer detector 120 and is configured to separate ions based on their mobility difference between in high-field and low-field). Additionally, it will be appreciated that the mass analyzer detector 120 can comprise a detector that can detect the ions that pass through the analyzer detector 120 and can, for example, supply a signal indicative of the number of ions per second that are detected.

Figure 2:
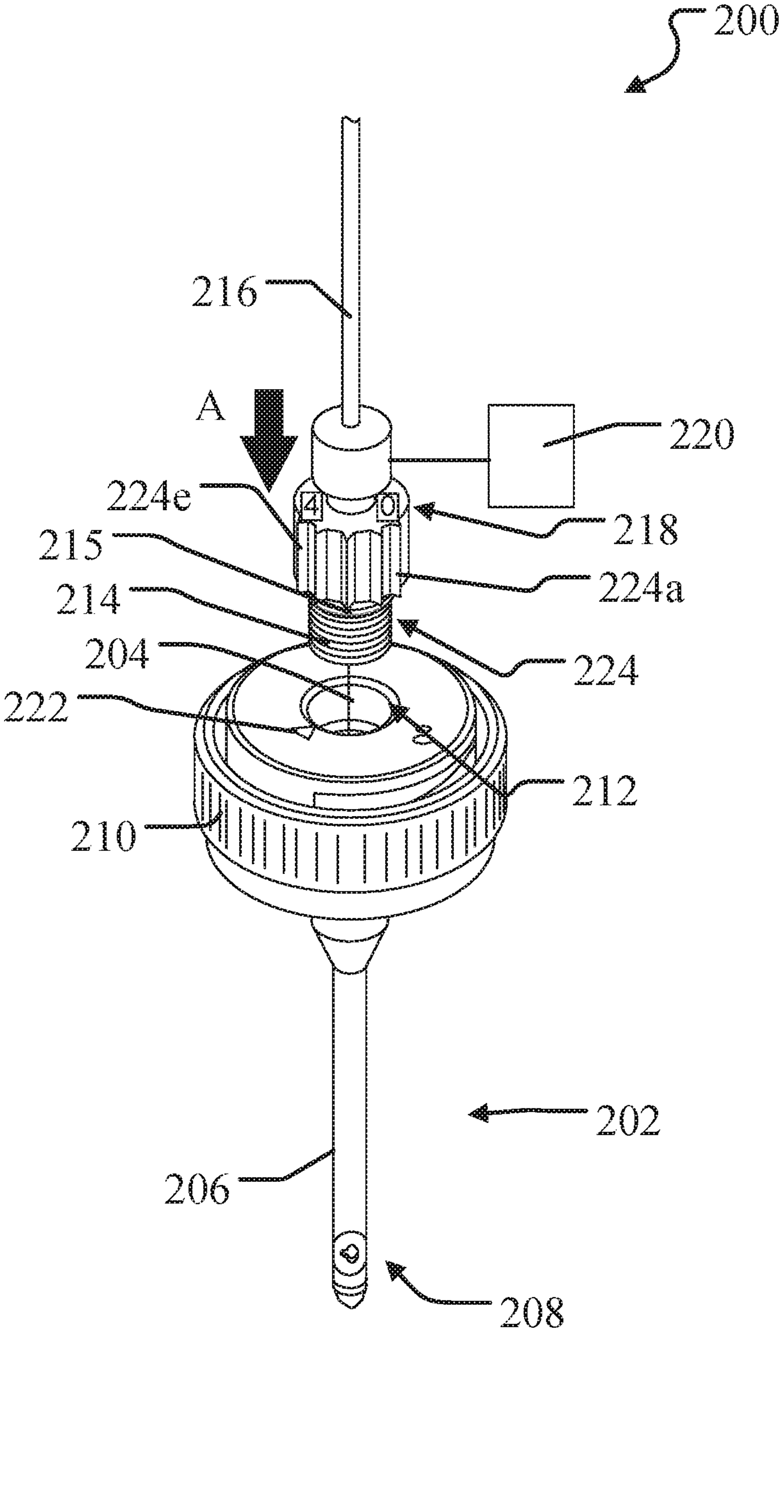
FIG. 2 a partial perspective view of an ESI.

FIG. 2 is a partial perspective view of an ESI source 200, namely a nebulizer probe 202 and an inner electrospray electrode 204. The nebulizer probe 202 includes an outer conduit 206 including a distal end 208 from which liquid may be discharged into an ionization chamber, such as described above. A housing 210 may be utilized to secure the nebulizer probe 202 within a mass spectrometry device. The housing 210 defines a central channel 212 through which the electrospray electrode 204 passes. The electrospray electrode 204 may be connected to a threaded base 214 that may be received in a mating threaded portion of the central channel 212. Within the threaded base 214, the electrospray electrode 204 may be fluidically coupled to a conduit 216 of a liquid handling system of the mass spectrometry device. A ferrule 218 may surround a portion of the threaded base 214 and may be rotated so as to advance A a tip (not shown) of the electrospray electrode 204 within the outer conduit 206 of the nebulizer probe 202, towards the distal end or tip 208. A compressible o-ring or gasket 215 may be disposed between the ferrule 218 and housing 210 so as to maintain the gas seal regardless of depth of threaded base 214 within the central channel 212. Rotation of the ferrule 218 in an opposite direction may retract the tip of the electrospray electrode 204 away from the distal end 208.

Rotation of the ferrule 218 may be either mechanized or manual. In the former implementation, a motor 220 may be used to advance or retract the electrospray electrode 204. In the latter, it may be advantageous to include some type of indexing feature on or in the ferrule 218 and/or the housing 210. In FIG. 2, a visible indicator 222 is disposed on the housing 210. A plurality of reference markers 224 are disposed on the ferrule 218. The reference markers 224 may be colored portions of knurling, raised features, colored or uncolored lines, or other markers that may be selectively aligned with the indicator 222. Thus, rotation of the ferrule 218 from one reference marker 224 to another may change the position of the electrospray electrode 204 relative to the nebulizer probe 202. In examples, the ESI source 200 may be shipped with the reference marker 224*a* aligned with the indicator 222, thus positioning the electrospray electrode 204 in an initial position. A user may then rotate the ferrule 218 as required or desired to set a position of the electrospray electrode 204 that optimizes the signal generated as described in more detail below. Each of the various positions indicated by alignment of the various reference markers 224 with the indicator 222 may be considered to be a different positioning configuration of the indexing feature.

In addition to (or in lieu of) the visible indicator 222, the indexing feature may provide tactile feedback to the user (in the form of a detent may mate with a plurality of mating features), or audible feedback that may generate a "clicking" sound as the ferrule is rotated between multiple positions. As with the example depicted in FIG. 2, each of the various positions indicated by alignment of the detent with a selectively mating feature may be considered to be a different positioning configuration of the indexing feature. In other examples, rotation of the ferrule 218 may be by both motorized and manual adjustments. Further, each reference marker 224 may include a visible identifying feature, such as a number or letter. In FIG. 2, identifying features "0" and "4" are shown associated with a first reference marker 224*a* and a last reference marker 224*e*, respectively. Features "1", "2", and "3" may also be included proximate the other reference markers 224, but are not depicted for clarity.

The position of the electrospray electrode 204 relative to the nozzle probe 202 (e.g., a position disposed therein or protruding therefrom) is directly related to the strength of the Venturi aspiration force determining the analytical sensitivity and reproducibility, throughput, and matrix tolerance. In addition, the position directly impacts the data reproducibly. When the protrusion was off by approximately 40 micrometers, the data coefficient of variation is significantly increased, especially when simultaneously monitoring multiple components. Typically, it is challenging to properly set the position of the electrospray electrode 204 relative to the nozzle probe 202 during the manufacturing process, which results in a reduction of performance. In an example, the flow rate of the nebulizer gas, which might vary at different customers' sites, may dictate the proper position of the electrospray electrode 204. Further, probe-to-probe variance cannot be controlled with the very small tolerances present. Thus, it is advantageous to position of the electrospray electrode 204 for conditions present at the users' site. In known examples, this positioning process was carried out by monitoring the flow rate at the OPI and noting when the liquid boundary (128 in FIG. 1) transitioned from a vortex condition (generally upward in FIG. 1) or a flat condition (generally flat) to an overflow condition (generally downward). Further, in some AEMS devices, the OPI is facing downward at the fixed position and a drip sensor automatically ends operation of the entire system during an overflow condition where the liquid boundary 128 projects downward from the OPI 104. As such, it may not be desirable to use the overflow condition as the transition point in an effort to more quickly position the electrospray electrode 204 position at a users' site.

Figure 3:
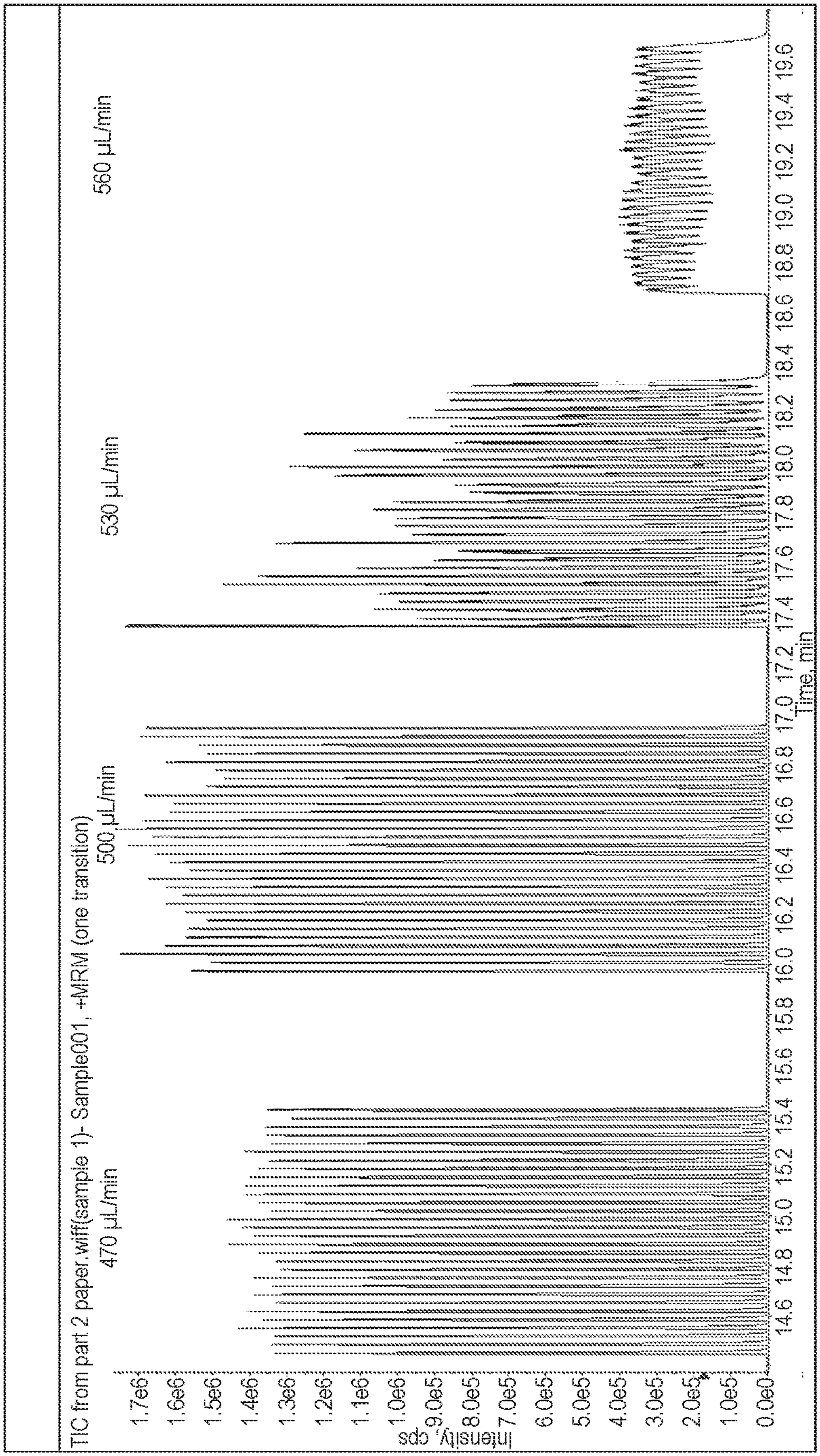
FIG. 3 depicts plots of ion intensity signals for samples at various flow rates in a mass spectrometry device.

FIG. 3 depicts plots of ion intensity signals (measured, e.g., in counts/second) for samples at various flow rates in a mass spectrometry device; the plots are depicted adjacent each other for comparative purposes. The relationship between the ion intensity signal peak shape and flow rate is depicted, where the position of the electrospray electrode relative to the nebulizer probe is fixed. At an operational transport liquid flow rate of 470 microliters/min, the ion intensity signal (as characterized by one or more of a signal peak, a peak width, and a signal baseline) is fairly consistent. When the flow rate is increased beyond the operational flow rate range (e.g., to 500 microliters/min), the peak begins to become unstable and wider. Another example is depicted at a flow rate of 530 microliters/min, where the surface meniscus at the OPI shakes between vortex and flat resulting in an inconsistent (or unresolved) signal. At even higher flow rates (e.g., at 560 microliters/min depicted), the surface meniscus at the OPI begins to dome and may drip. This dome shape at the OPI may trigger the drip sensor, which may shut down the mass spectrometry device in existing devices. In view of the conditions presented in FIG. 3, the inventors have determined that the transition state between good resolved peak (such as depicted at 470 microliters/min flow rate) and the choppy/wider peak shape (e.g. between 500-530 microliters/min in FIG. 3) may be effected by the position of the electrospray electrode in the nebulizer probe. By changing the position of the electrospray electrode, higher flow rates at the OPI are possible while still maintaining a resolved signal.

As such, the technologies described herein utilize new methods for fast electrospray electrode positioning (for the strongest aspiration force) while maintaining flow to the OPI. The methods allow for achieving a pressure drop at the nebulizer nozzle (located at the distal end 208 of the nebulizer probe 202) that is optimal for transport of a liquid sample through conduit 216 of the liquid handling system in a consistent manner. The position of the electrospray electrode 204 relative to the distal end 208 of the nebulizer probe 202 determines what part of the gas expansion it is in and hence what reduced pressure it experiences. The nebulizer gas acts to disperse the liquid sample and aspirate liquid from the OPI depicted in FIG. 1. More specifically, the distance which the tip of the electrospray electrode 204 protrudes beyond the distal end 208 determines a negative pressure differential within the conduit from the OPI, thus drawing the transport liquid and the liquid sample therethrough. A desirable position of the electrospray electrode at a particular flow rate maintains a vortex or flat condition of the liquid boundary at the OPI, thus preventing triggering of any overflow sensor that may be present.

Figure 4A:
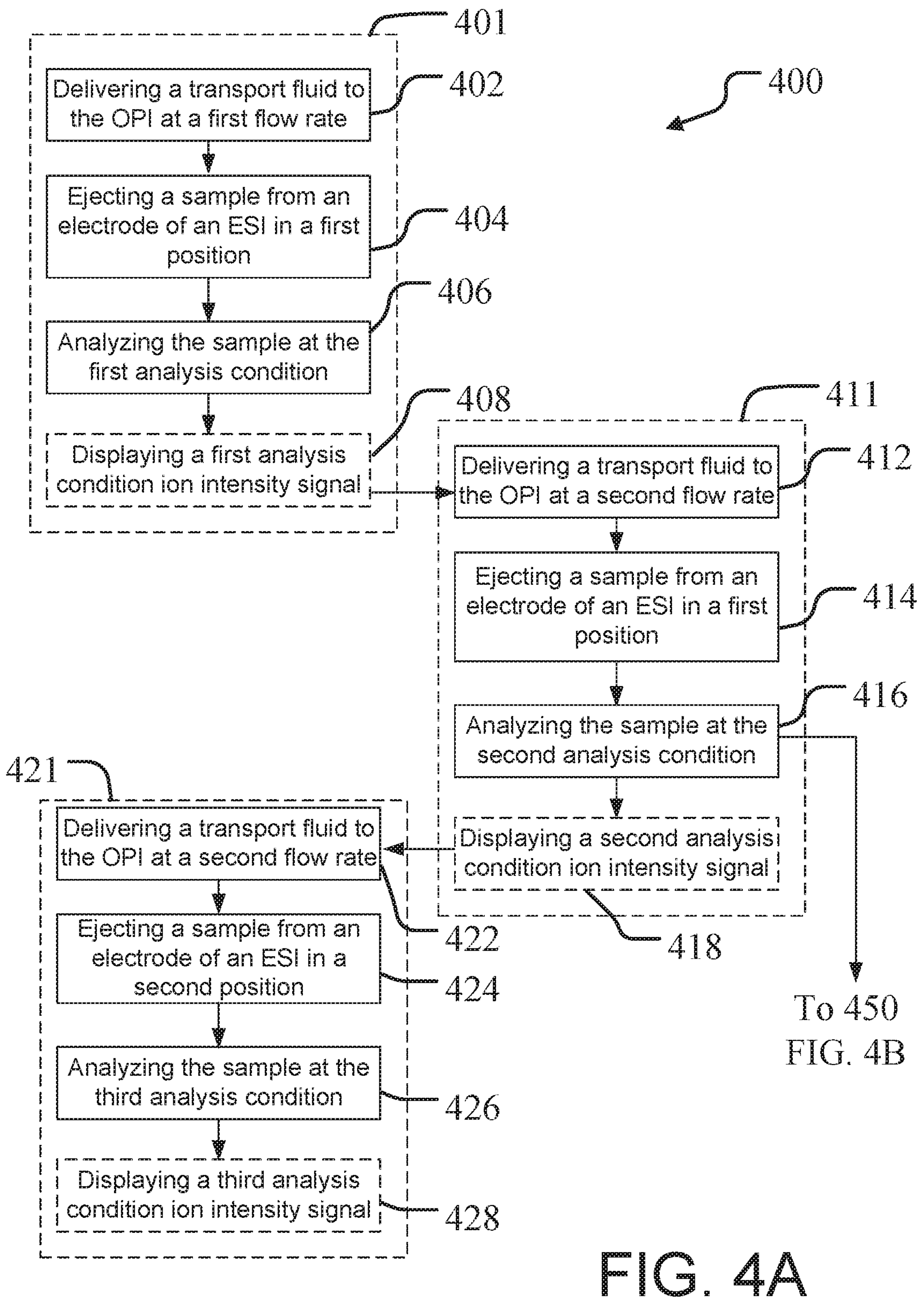
FIGS. 4A and 4B depict a method of adjusting a position of an electrode within a nebulizer probe of an ESI.
Figure 4B:
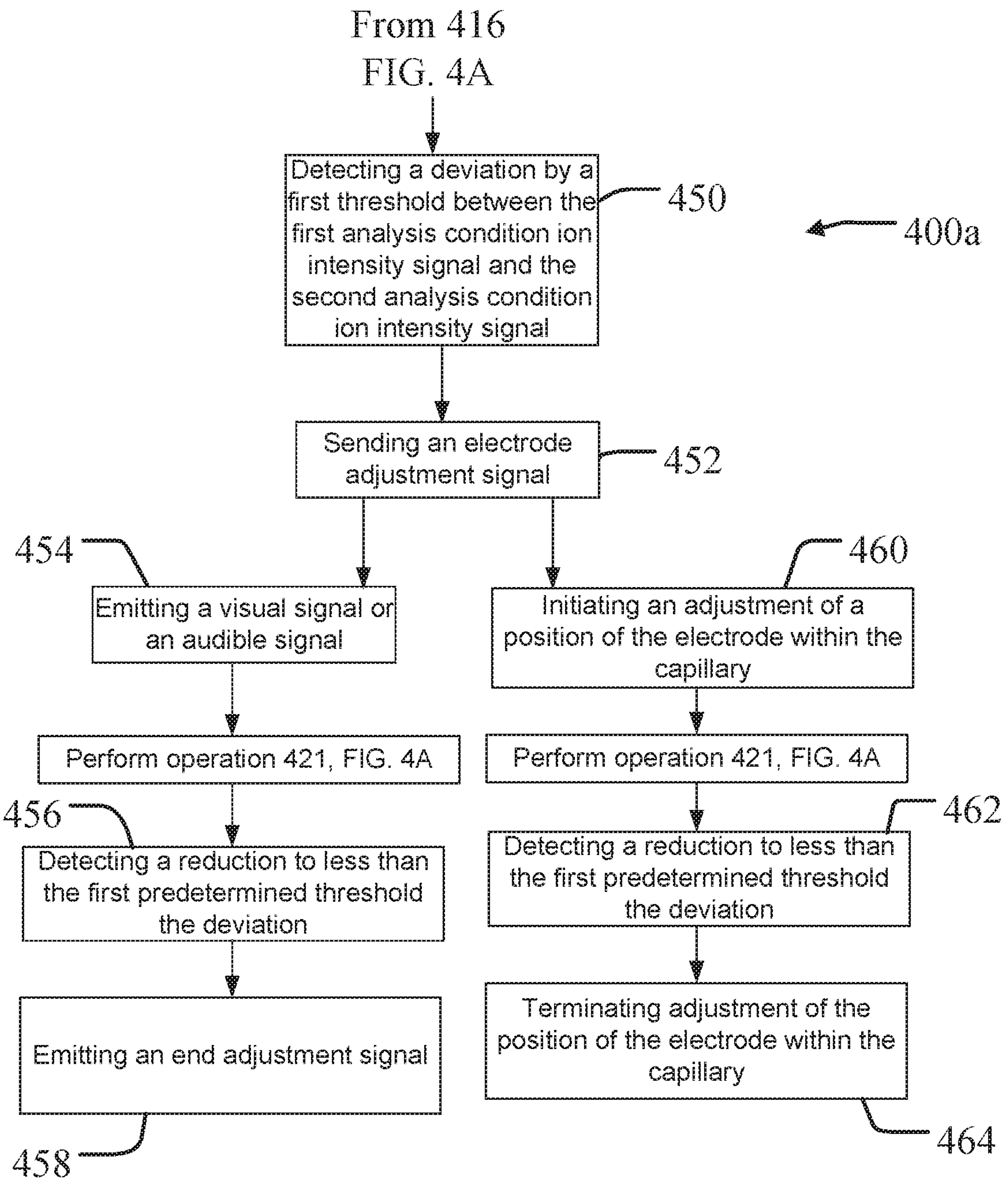

FIGS. 4A and 4B depict a method 400 of adjusting a position of an electrode within a nebulizer probe of an ESI, for example, as in a mass spectrometry device. Prior to beginning the method 400, the position of an electrospray electrode within a nebulizer probe (e.g., as depicted in FIG. 2) is set to an initial position. This may be performed at a manufacturing site or at a user's site (e.g., by a technician when servicing the mass spectrometry device). The initial position may be measured by a length of protrusion of the tip of the electrospray electrode 204 and may be longer than a typical operation range. As an example, a typical protrusion used during operation may be about 300 micrometers, while the initial protrusion position may be set at about 400-450 micrometers. This allows the protrusion to be reduced during performance of the method 400 depicted in FIG. 4. As described above with regard to FIG. 2, the length of protrusion may be reduced (and thus the position set for a particular user) by rotating the threaded base 214 at the ferrule 218 (or operating the motor 220).

Once the electrode is set in the initial position, transport fluid flow is delivered to the OPI and a mixture of the transport fluid and a sample (e.g., as ejected from a well plate into the OPI) is ejected from the nebulizer probe. This mixture is a dilution of the sample in the transport fluid. The flow rate of transport fluid may be increased or decreased (e.g., based on the overflow flow rate of the OPI, as apparent to a person of skill in the art), until the resulting ion intensity signal is resolved, e.g., as determined by a technician while viewing the signal. The ion intensity signal provides sufficient information for a technician or operator to evaluate the displayed signal. If the technician or operator determines that the signal is sufficiently defined (e.g., resolved) at the initial electrode position and at a particular flow rate, a first analysis condition is known. Once the first analysis condition is known, the position of the electrode may be further adjusted, consistent e.g., with method 400, below.

The method 400 begins with performing a first analysis of the mixture at a first analysis condition, depicted by dashed box 401 in FIG. 4A. The first analysis condition may be characterized by the initial position of the electrode in the nebulizer probe and the first flow rate of a transport liquid into the OPI, as described above. The first analysis includes operation 402, delivering a transport liquid to the OPI at a first flow rate. Thereafter, ejecting the mixture from the electrode of the ESI in the initial or first position in the probe, operation 404, is performed. The mixture ejected from the ESI during the first analysis condition may then be analyzed with the mass spectrometry device, operation 406. This analysis generates a first analysis condition ion intensity signal, for example, as depicted on the left-hand side of FIG. 5A, below. The analysis performed is well-known in the art of mass spectrometry devices. In optional operation 408, this first analysis condition ion intensity signal is displayed. Display thereof may be sufficient for a visual evaluation of the signal by a skilled technician or operator of the device, who may be performing initial set up of the device, servicing the device, etc. The first analysis condition ion intensity signal is characterized by at least one of a peak height, a peak width, a baseline between at least two adjacent peaks, a peak-to-peak variation, and a peak shape. In effect, operations 402-408, are performed as the first analysis condition (defined by the initial position of the electrode and the transport fluid flow rate to achieve a resolved signal) becomes known. Display of the first analysis condition ion intensity signal is optional in fully- or partially-automated systems, described in more detail in the context of FIG. 4B.

After performing the first analysis, the method 400 continues with performing a second analysis at a second analysis condition, depicted by dashed box 411 in FIG. 4A. The second analysis condition may be characterized by a first position of the electrode in the nebulizer probe and a second flow rate of a transport liquid. The second analysis includes delivering a transport liquid to the OPI at a second, higher flow rate, operation 412. The sample is ejected from the electrode of the ESI in the initial or first position in the probe, operation 414. The second flow rate may be determined iteratively. That is, the electrode may remain in the first position while the transport liquid is delivered at successively higher flow rates to the OPI. The mixture ejected from the ESI during the second analysis condition may be analyzed with the mass spectrometry device during these iteratively higher ejections, operation 416. This analysis generates a second analysis condition ion intensity signal. In fully- or partially-automated systems, this second analysis condition ion intensity signal may be compared to the first analysis condition ion intensity signal, thus diverting flow of the method 400 to the adjustment loop 400*a* depicted in FIG. 4B. In a non-automated method, however, optional operation 418, displaying the second analysis condition ion intensity signal is performed. As with the first analysis condition, the technician or operator may again visually evaluate the ion intensity signal. Ion intensity signals generated from performance of the second analysis that deviate sufficiently from those of the first analysis (e.g., as to a degraded or unresolved signal, as defined by the signal characteristic(s) identified above) would be indicative of an undesirable position of the electrospray electrode of the ESI at this elevated, second flow rate at the OPI. This is depicted, for example, as the signal on the right side of FIG. 5A and on the left side of FIG. 5B. Thereafter, the ion intensity signal at this second flow rate must be resolved by changing the position of the electrode.

To resolve the ion intensity signal of the second analysis, performing a third analysis at a third analysis condition, depicted by dashed box 421 in FIG. 4A, is performed. The third analysis condition may be characterized by a second position of the electrode in the nebulizer probe and the second flow rate of the transport liquid. The third analysis includes delivering a transport liquid to the OPI at the second flow rate, operation 422. The mixture is ejected from the electrode of the ESI in a second position in the probe, operation 424. The second position may be determined iteratively. That is, the electrode may be placed in a second position while the transport liquid at the second flow rate is delivered to the OPI. Thereafter, the sample may be ejected, and a third analysis condition may be analyzed, operation 426, as described herein. If desired, the third analysis condition ion intensity signal may be displayed, operation 428, so the signal may be visually assessed by the technician or operator to determine if the ion intensity signal has resolved. If so, this second position may be stored as an appropriate position for that particular flow rate. If not, the second position may be adjusted and the sample ejected from the ESI while the transport liquid is delivered to the OPI at the second flow rate. The signal may again be visually assessed. This may be performed iteratively, with incremental changes to the electrode position, until the ion intensity signal is resolved.

In examples, a maximum flow rate may be achieved where further positioning of the electrode cannot resolve the ion intensity signal. As such, the technician or operator may then return the electrode to the last saved position and associated flow rate for subsequent use of the mass spectrometry device. In another example, further positioning of the electrode relative to the probe may not be possible due to structural limitations. In that case, the technician or operator may then return the electrode to the last saved position and associated flow rate.

The above-described method 400 contemplates a configuration where the mass spectrometry device performs certain operations, and a technician or operator visually evaluates the ion intensity signals and makes adjustments to a position of the electrode. The method 400 also contemplates, however, a fully- or partially-automated aspect, which may remove subjectivity inherent in a method that includes some human interaction. Such an alternative method is depicted in FIG. 4B as an adjustment loop 400*a*. This fully- or partially-automated aspect contemplates the device or technician, respectively, setting the second flow rate configuration of the transport liquid, operation 414. From operation 416 in FIG. 4A, flow begins with detecting a deviation by a first predetermined threshold between the first analysis condition ion intensity signal and the second analysis condition ion intensity signal, operation 450. The first threshold may be set by the manufacturer, end user, or technician or operator. One or more characteristics of the ion intensity signals at the first and second analysis conditions, such as signal peak, peak width, and signal baseline may be compared. Deviation of one or more of these from the first threshold (e.g., about 1%, about 5%, about 10%, etc.) may be sufficient for the method 400*a* to automatically determine that the signal is unresolved at this higher flow rate. As such, the method 400*a* includes sending an electrode adjustment signal based at least in part on the deviation, operation 452. In a partially-automated version of the method 400*a*, operation 452 includes emitting at least one of a visual signal and an audible signal, operation 454, thus signaling to the technician or operator to adjust a position of the electrode relative to the probe. This corresponds to performing a third analysis of the sample at the third analysis condition, operation 421. The electrode adjustment may be performed by the technician or operator iteratively, with transport liquid ejected at the second flow rate at each subsequent electrode position as described above (e.g. with regard to operations 422 and 424), until the deviation between the first analysis condition ion intensity signal and the second analysis condition ion intensity signal is reduced to less than the first predetermined threshold the deviation, operation 456, which may be determined by the system to correspond to a resolved signal. Once below the first threshold, an end adjustment signal may be emitted, operation 458, as the electrode has reached the appropriate second position. The sample of this third analysis condition is analyzed (e.g., as in operation 426). This is depicted, for example, as the signal on the right side of FIG. 5B.

In a fully-automated system, operation 452 includes initiating an adjustment of a position of the electrode within the probe, operation 460. Thereafter, operation 421 is performed. The electrode adjustment may be performed iteratively, with transport liquid ejected at the second flow rate at each subsequent electrode position, until the deviation between the first analysis condition ion intensity signal and the second analysis condition ion intensity signal is reduced to less than the first predetermined threshold the deviation, operation 462. Once below the first threshold, further adjustment may be terminated, operation 464, as the electrode reaches the second position.

Figure 5A:
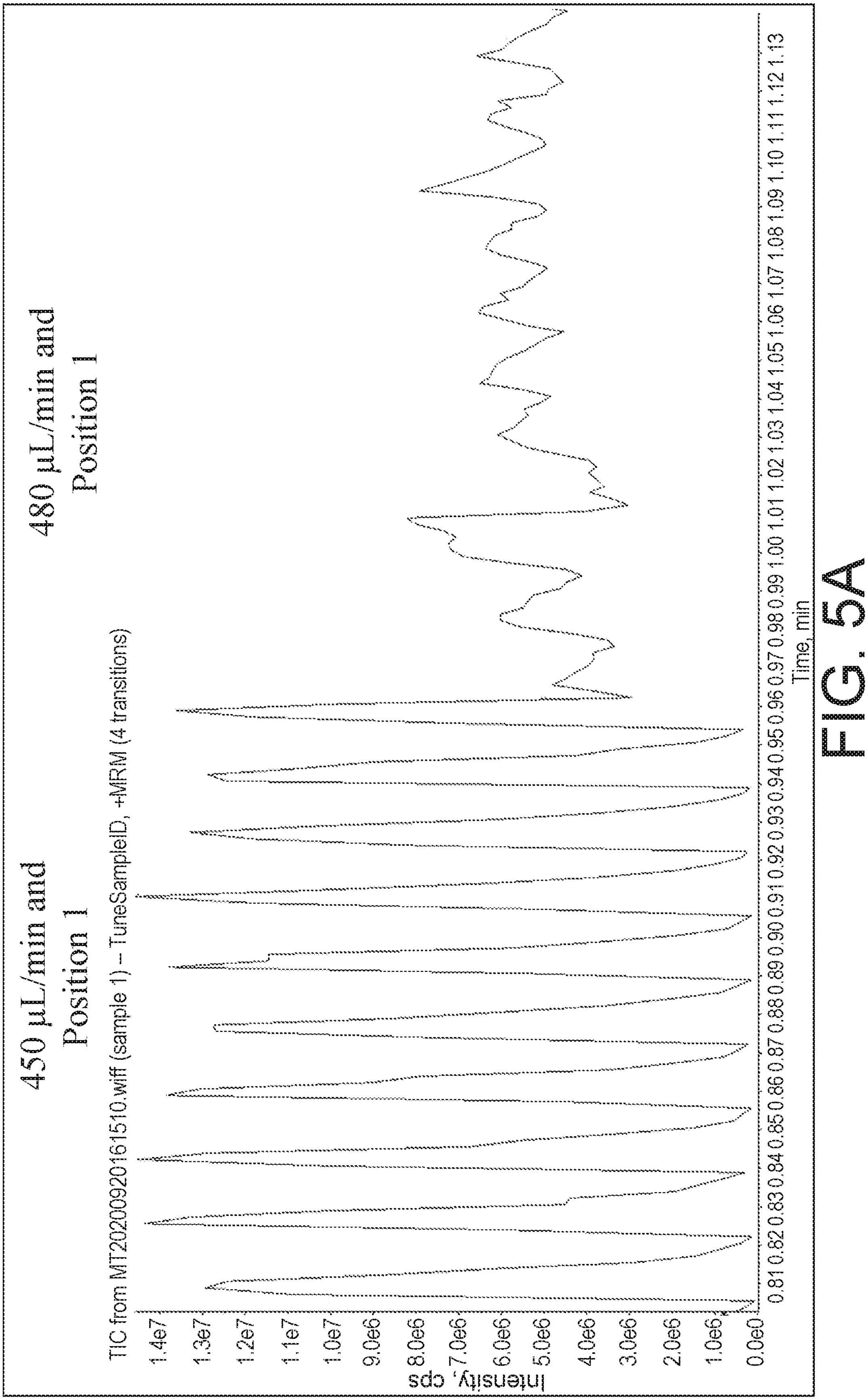
FIGS. 5A and 5B depict ion intensity signals for samples ejected from electrodes at various positions, and with transport liquids introduced at various flow rates, in a mass spectrometry device, as practiced by an example method.
Figure 5B:
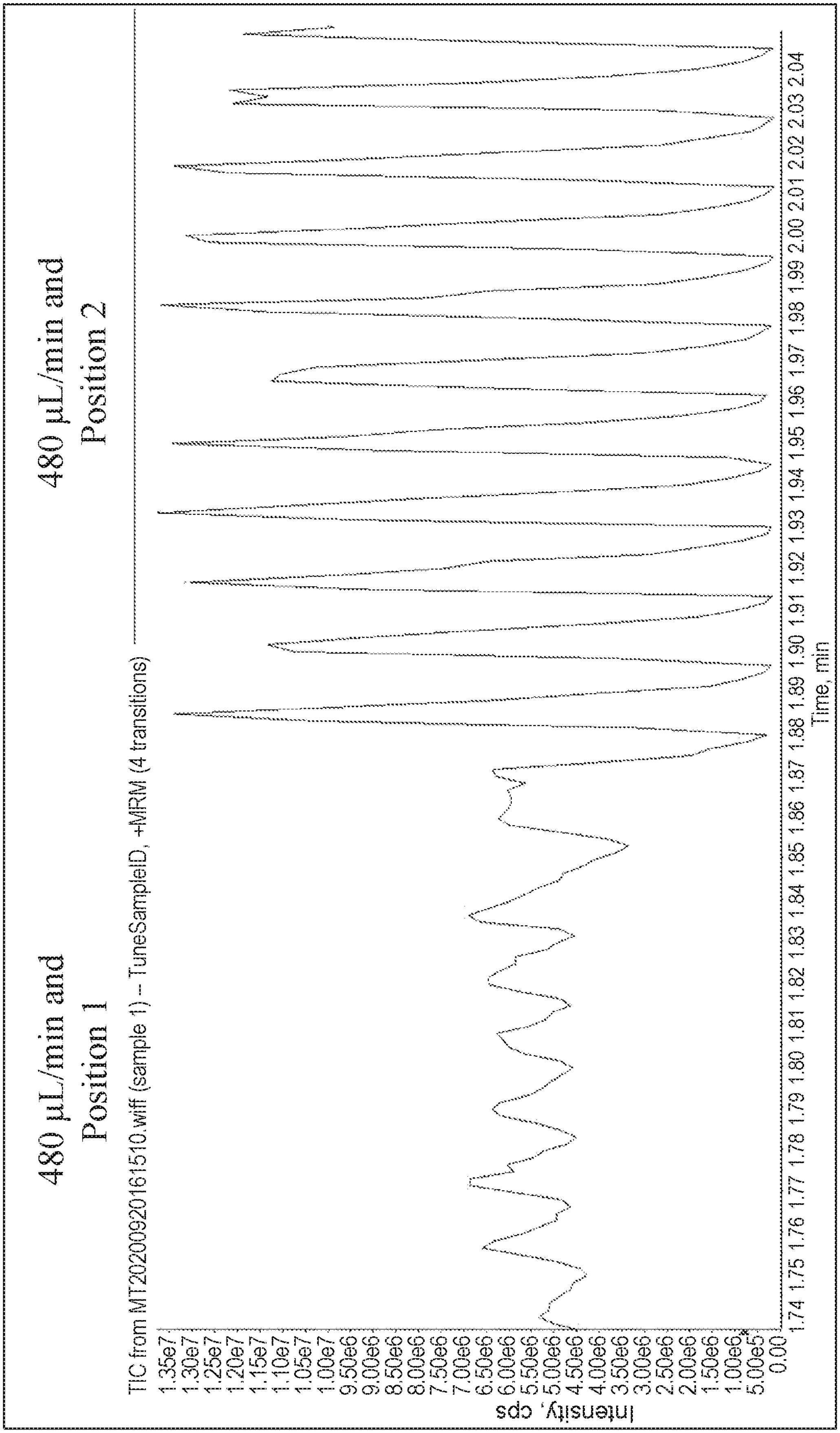

FIGS. 5A and 5B depict ion intensity signals for samples ejected from electrodes at various positions, and with transport liquids introduced at various flow rates, in a mass spectrometry device, as practiced by an example method such as the method of FIGS. 4A and 4B. The ion intensity signals may be similar to those displayed as part of the above-described methods, at various flow rates and electrode positions. Note in FIGS. 5A and 5B, specific distances that the electrospray electrode protrudes from a nebulizer probe are not measured; rather the plots depict first and second protrusions (Position 1 and Position 2, respectively) for illustrative purposes. On the left side of FIG. 5A, an ion intensity signal corresponding to a transport liquid flow rate of 450 microliters/min and an electrode Position 1, is depicted. The ion intensity signal, as characterized by a signal peak, peak width, and/or signal baseline is indicative of an initial electrode position that produces resolved signals in conjunction with a first flow rate. Upon increasing the flow rate to a higher rate of 480 microliters/minutes, while retaining the electrode at Position 1, it would be readily apparent to a technician or operator that the ion intensity signal is no longer resolved, which would necessitate adjusting the position of the electrospray electrode within the nebulizer probe. The deviation of signal peaks, for example, may also be detected in a fully- or partially-automated method as deviating by a particular threshold from the ion intensity signal at the first flow rate of 450 microliters/minute. The threshold, in examples, may be about 5%, about 10%, about 20%, or about 25%, although other deviations are contemplated. FIG. 5B depicts the change in ion intensity signal at the same higher flow rate of 480 microliters/min, while the electrode is at the first position. As the position changes to Position 2 (on the right side of the plot of FIG. 5B), the ion intensity signal resolves. This resolved signal is indicative of Position 2 of the electrospray electrode within the nebulizer probe that is positioned for desirable results at that particular flow rate. While the resolved signal would be readily apparent to a trained technician or operator, the difference between signals on the left and right sides of the plot of FIG. 5B would also be detectable in a fully- or partially-automated method.

Figure 6:
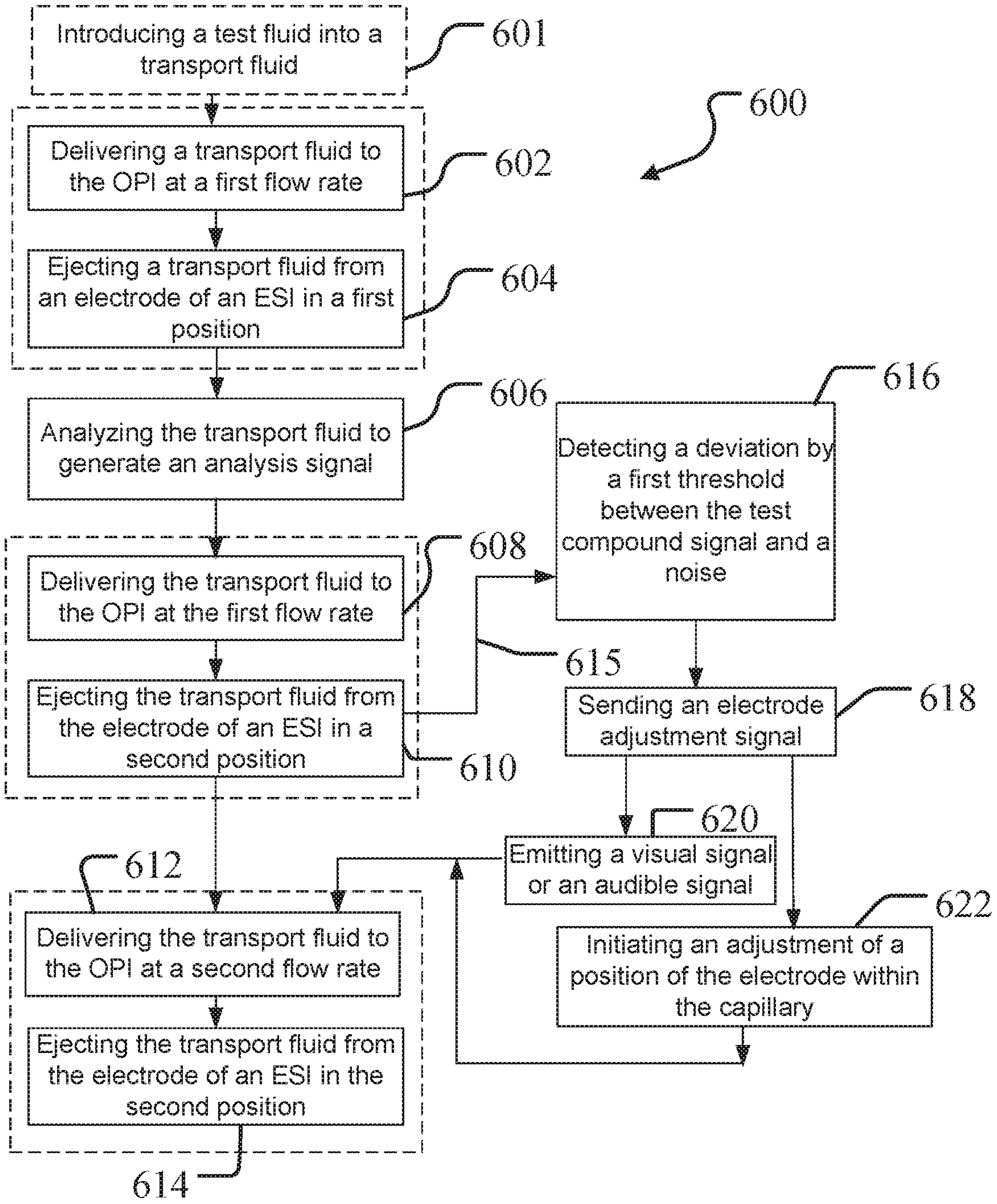
FIG. 6 depicts another method of adjusting a position of an electrode within a nebulizer probe of an ESI.

FIG. 6 depicts another method 600 of adjusting a position of an electrode within a nebulizer probe of an OPI. This method 600 is based on monitoring a signal generated from within the transport liquid flow, which is introduced to the OPI at a steady rate giving a steady signal which is characterized by its intensity and noise. Depending on the flowrate through the OPI, the signal may deviate from a steady state by presence of noise events of a given periodicity and signal pulsing of a given frequency and duty cycle The signal may be due to a compound(s) present in the transport fluid alone, or from a test compound added to the transport fluid. Stability of signals generated by the ions indicates the flow mode through the OPI. Different flow modes through the OPI include: balanced flow where the transport liquid completely fills the conduit without any bubbles and signal noise is inherent of the ESI process at the nebulizer; and an over-pumped state where the aspiration force from the ESI is in excess of the transport fluid flow provided to the OPI. flow fluctuations may result and appear as specific type of noise in the resulting signal.

In an optional first operation 601, a test fluid that, when ejected into a mass spectrometry device generates a detectable ion, may be introduced to a transport liquid, for example at the reservoir depicted in FIG. 1, or along a flow path therefrom (e.g., at a port). Examples of such fluids that would generate readily detectable ions may include the transport fluid itself, or another fluid containing detectable contaminates or other compounds.

Prior to beginning the method 600, the position of an electrospray electrode within a nebulizer probe (e.g., as depicted in FIG. 2) is set to an initial position, for example as described above with regard to the method 400 of FIG. 4. Once the electrode is set in the initial position, transport fluid flow is delivered to the OPI and the transport fluid is ejected from the nebulizer probe. The flow rate of transport fluid may be increased or decreased (e.g., based on the overflow flow rate of the OPI, as apparent to a person of skill in the art), until the resulting analysis signal is resolved, e.g., as determined by a technician while viewing the signal. Such a resolved signal is depicted on the left side of FIG. 7A, where the signal spikes (signal reductions) indicative of the test signal intensity are depicted and distinguishable from the general noise present in the signal. The process starts from the high noise electrode position as shown on the left of FIG. 7A, on the right of FIG. 7B, and in FIG. 7C, as well as between 0.7 min and 1.6 min of FIG. 7D. Initially, such an electrode position is set by a technician.

The method 600 begins with operation 602, delivering a transport liquid to the OPI at a first flow rate. Thereafter, a transport liquid is ejected from the electrode of the ESI in the initial or first position in the probe, operation 604. In view of the fluidic connection between the OPI and ESI, operations 602 and 604 may be effectively performed simultaneously, as indicated by the dashed line in FIG. 6. The transport liquid ejected from the ESI may then be analyzed with the mass spectrometry device, operation 606, and an analysis signal, indicating the test compound signal intensity and stability (noise), may be generated.

After generation of the analysis signal, flow continues to operations 608 and 610, performed substantially simultaneously as indicated by the dashed line in FIG. 6. Operation 608 includes delivering the transport liquid to the open port interface at the first flow rate. Operation 610 includes ejecting the transport liquid from the electrode in a second position relative to the nebulizer probe. Due in part to these simultaneous and continuous operations, ejecting the transport liquid from the electrode in a second position relative to the nebulizer probe, operation 608, eliminates noise caused by the periodic drop outs (reduction spikes, may or may not be periodic) in the test compound signal The noise reduction is the result of a higher pressure drop at the ESI tip, eliminating the liquid surface oscillation within the OPI that causes the dropouts. The resulting analysis signal characterized by the absence of the test signal intensity dropouts is depicted on the right side of FIG. 7A and left side of FIG. 7B.

Figure 7A:
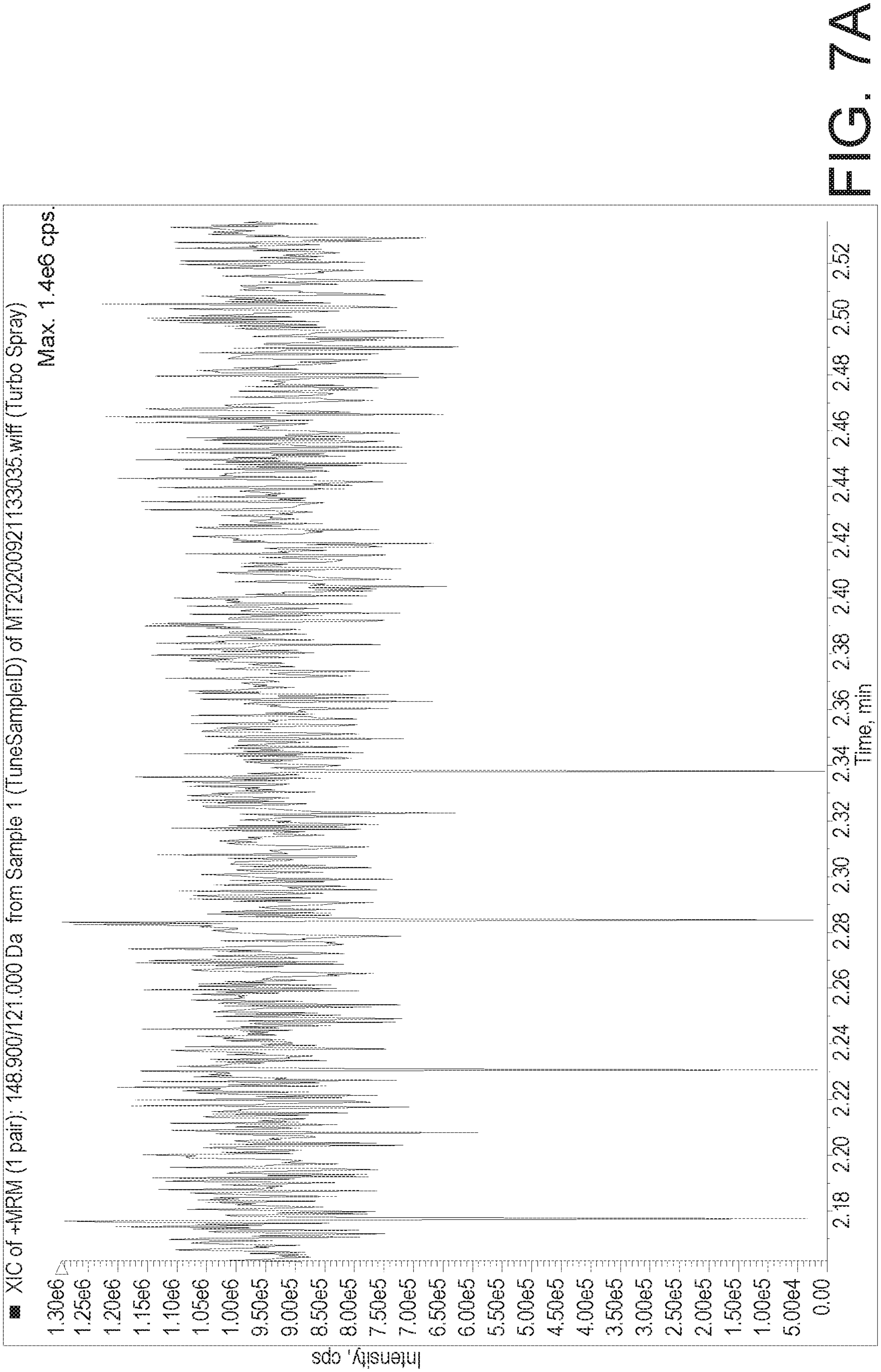
FIGS. 7A-7C depict ion intensity signals for samples at various flow rates in a mass spectrometry device, as practiced by another example method.
Figure 7B:
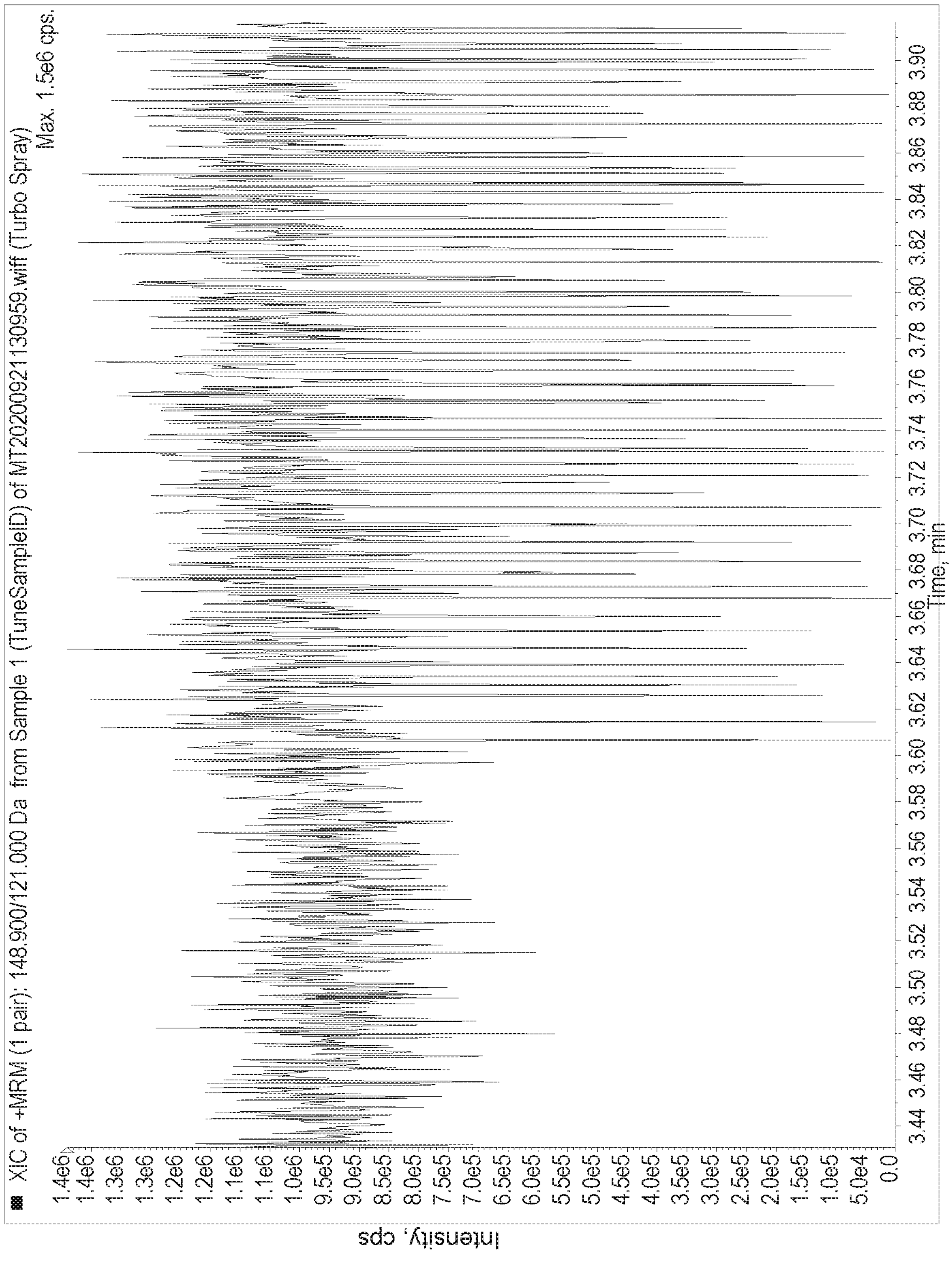
Figure 7C:
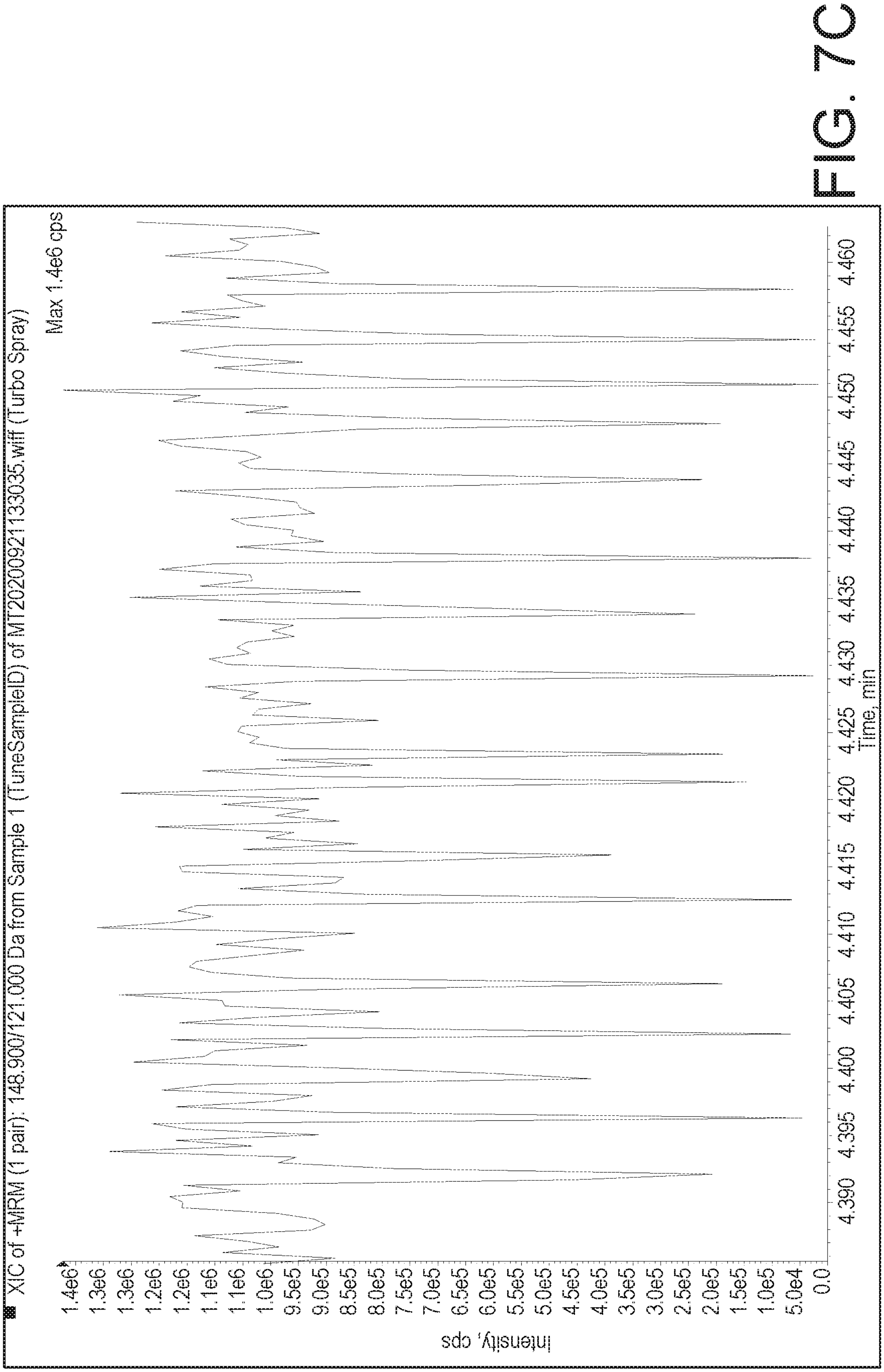
Figure 7D:
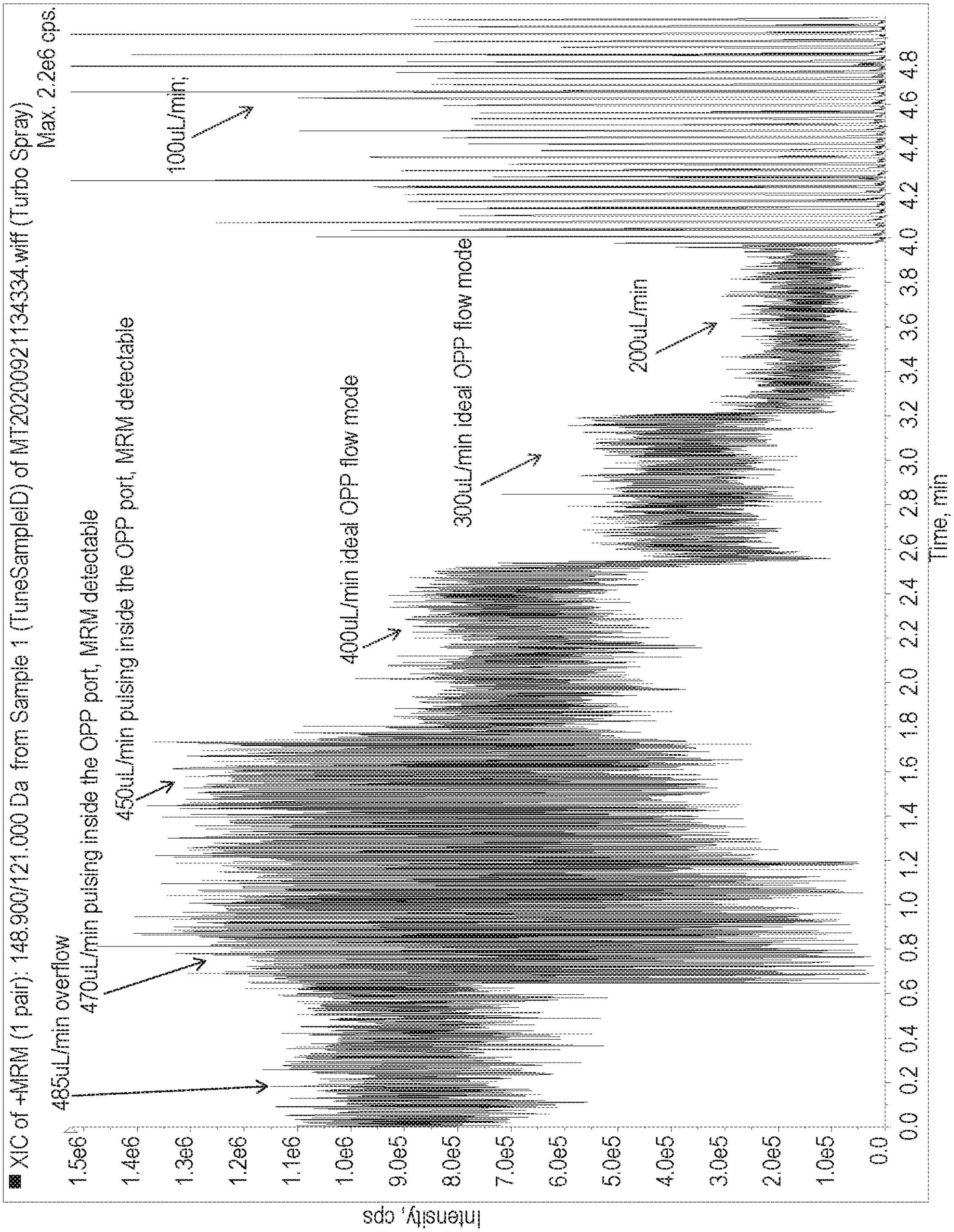
FIG. 7D depicts an example of a test compound signal across an entire OPI flow range.

FIGS. 7A-7C depict analysis signals for test compound being introduced at various flow rates to a mass spectrometry device, as practiced by example method 600. FIGS. 7A-7B depict the transition between the two flow modes. Physically, this transition is characterized by the onset or elimination of the liquid surface oscillation within the OPI port. As the flow is reduced from the in-port oscillation mode, the optimal sample transfer flow regime is reached, the dropouts become absent, as a permanent distortion of the liquid surface inside the OPI replaces the liquid surface oscillation. FIG. 7D shows an example of test compound signal across the entire OPI flow range. In FIG. 7D, flowrate is decreasing in steps as time increases, different time segments represent the different flow modes encountered while operating the OPI with an electrode at a fixed protrusion from the nebulizer probe while nebulizer gas flow is kept constant. The first-time segment, 0.0 to 0.6 min, shows test signal at an "overflow" mode. In this mode more transport liquid is delivered to the OPI port than the pressure differential can withdraw to the ESI tip. As a result, further increases to the flowrate do not change the intensity or noise of the test signal since the transport flow is being moved in a closed flow mode, which represents the maximum deliverable flow rate at that electrode protrusion. Flowrate increase beyond the maximum causes the excess liquid to spill over the OPI edges. Since the test signal is proportional to the flowrate delivered to the ESI tip, the signal does not change with flowrate above the maximum. Reducing the flow rate to just below the maximum, introduces liquid surface oscillation within the port as shown by the test signal noise in the time segment, 0.7 to 1.6 min. The same state is also shown on left side of FIG. 7A, the right side of FIG. 7B and in FIG. 7C. The specific nature of the noise, such as frequency and "depth" of the dropouts, is indicative of how far below the maximum (closed) flow the actual flowrate is. While any of the transitions in signal quality shown in FIG. 7D may be used for the electrode protrusion optimization, it is the onset of the high signal noise state that is most readily employed for that purpose. Reducing the flowrate further eliminates the liquid surface oscillation within the OPI port as the liquid surface within the port undergoes a permanent distortion and the noise is reduced as the noise component associated with the in-port oscillation is eliminated (e.g., the downward spikes in the test signal seen in FIGS. 7A, 7B, and 7C are eliminated). As the flowrate is reduced within this flow mode, shown in time segment 1.8 to 3.9 min, test compound intensity drops as less of the test compound is being delivered to the ESI with each flowrate reduction.

The final segment of FIG. 7D, 4 to 4.9 min, represents a flow mode where liquid is delivered to the OPI at a rate much below the maximum (closed) flowrate and results in a segmented flow, where transport liquid exits the ESI for only a portion of the detection time. The duty cycle of the pulsed signal is indicative of the degree of over pumping at this extreme flow mode.

The signal pattern shown in FIG. 7D will shift to higher or lower flowrates depending on the pressure differential between the OPI and ESI tip. The pressure differential sets up the motive force to deliver the liquid to the ESI tip. Adjusting the electrode protrusion from the nebulizer nozzle, places the ESI tip at different pressure regimes of the expanding nebulizer gas hence setting up different pressure differential between the OPI and ESI tip. The shift of the FIG. 7D graph with the changes to the electrode protrusion are then used to optimize its location with respect to the nebulizer nozzle. The objective is to achieve the highest ideal OPI transport flowrate. Changing the nebulizer gas flow would also shift the graph and a similar process could be used to optimize the gas flow expansion. More specifically the flow at which each transition between the two different flow modes occurs depends on the pressure drop generated at the ESI tip by the nebulizer. The pressure drop also determines the balanced maximum flow deliverable to the ESI tip. A single balanced flow will exist for a given pressure drop. A change in pressure drop will change the balanced flow rate and hence shift the transitions in the signal to different flowrates. Since the pressure differential between the ESI tip and the OPI changes with the electrode protrusion from the nebulizer nozzle, the balanced flow will change with it as will the transitions between different flow modes (regimes). Each of the transitions can be used in a process similar to the method 600 to achieve optimal electrode protrusion by detecting an appropriate attribute of the test compound signal. The detection can be tuned to decrease or increase in signal standard deviation or alternatively to detecting certain magnitude dropouts at a certain frequency.

Returning to FIG. 6, an analysis signal, may be displayed, for example, as described above with regard to the method 400 of FIGS. 4A and 4B. The electrode is manually or automatically adjusted such that the transition between the two modes (in flow and in signal) occurs at the highest transport liquid flow setting. Thus, operation 612 includes delivering the transport fluid to the OPI at a second flow rate. Substantially simultaneously (as depicted by the dashed line), operation 614, ejecting the transport liquid from the electrode of the ESI in the second position may be performed. This may require iterative adjustment of the flow on the part of the technician or operator, while watching the display to identify a signal change. Depending on how far away from the optimum the system starts, the search for maximum balanced flow could take form of uniform steps or bisection algorithm for faster location of the maximum flow.

While the method 600 of FIG. 6 is described above as requiring some type of technician interaction, loop 615 describes a fully- or partially-automated method that may detect the test compound signal, its dropouts and/or noise associated with it. This portion of the method 600 begins at operation 616, where detecting a deviation by a first predetermined threshold between the test compound signal intensity and the associated noise is performed. The thresholds may be determined based on comparisons of any one or more of the characteristics of the analysis signal, a signal intensity, its minimums, their periodicity (frequency), duration (duty cycle), and associated noise (% CV), or other characteristics as described elsewhere herein. Deviation of one or more of these from the first threshold (e.g., about 1%, about 5%, about 10%, etc.) may be sufficient. The method 600 includes sending an electrode adjustment signal based at least in part on the deviation, operation 618. In a partially-automated version of the method 600, operation 618 includes emitting at least one of a visual signal and an audible signal, operation 620, thus signaling to the technician or operator to adjust the flow rate. This adjustment may be performed by the technician or operator iteratively, as operation 614 (the electrode position being already set as operation 612), until the desired flow rate is identified. In a fully-automated system, operation 618 includes initiating an adjustment of a position of the electrode within the probe, operation 622. This adjustment may be performed iteratively by the system itself, as depicted in operations 612 and 614, until the electrode position that eliminates noise at the maximum flowrate is identified.

The technologies described in the context of FIG. 6 may be utilized regardless of the initial electrode position. For example, an operator may start at a flowrate/electrode protrusion combination that causes the test signal to pulse with a low duty cycle, such as shown in FIG. 7D, from 4.0 to 4.9 min. If the operator increases the flowrate without changing the electrode protrusion, the new signal will be less noisy and without periodic pulsing (e.g., a comparison may be made against signal intensity, signal noise (% CV), periodicity of the noise (frequency and depth of signal drop outs), and/or frequency of signal pulses). If the operator keeps increasing the flow rate, the operator will see an increase in steady state intensity without a significant noise increase. The operator may ultimately increase the flow rate until a significant increase in signal noise is observed. Thereafter, the electrode is then adjusted until the signal noise is reduced to low signal noise state, such as shown in FIG. 7D, at 1.8 to 2.4 min. The process then repeats, starting with an increase to the flowrate.

In another example, the operator may start at a low noise state, such as shown in FIG. 7D, from 2.6 to 3.9 min. Flowrate is increased until noise is increased, then the electrode position is adjusted to reduce the signal noise to the low state. The flowrate is increased again with the electrode at the new protrusion. The process may be repeated until a maximum flowrate for the transition between the low and high noise state is identified, thus marking the final electrode protrusion.

If the operator starts at the high noise state, such as shown in FIG. 7D, from 0.7 to 1.6 min. The electrode protrusion is adjusted to reduce the signal noise such that a further increase to the flowrate may be performed, according to the operations outlined in the previous paragraph. The high noise state may be identified by a reference to a historical level or the adjacent flow modes, either as an absolute level, difference, and/or a set threshold.

If the operator starts at the overflow mode, such as shown in FIG. 7D, from 0.0 to 0.6 min, the signal does not change as the flowrate is increased, hence the flowrate is reduced to introduce high signal noise state. Subsequent electrode adjustment(s) are performed, as described earlier, to achieve the desired electrode protrusion.

The electrode protrusion adjustment method is completed when the flowrate marking the onset of the high noise state cannot be further increased by the electrode protrusion adjustment. In other words, if the electrode protrusion adjustment only reduces signal noise such that subsequent flowrate increases do not increase signal and/or noise state, the previous electrode protrusion marks the optimum position.

Figure 8:
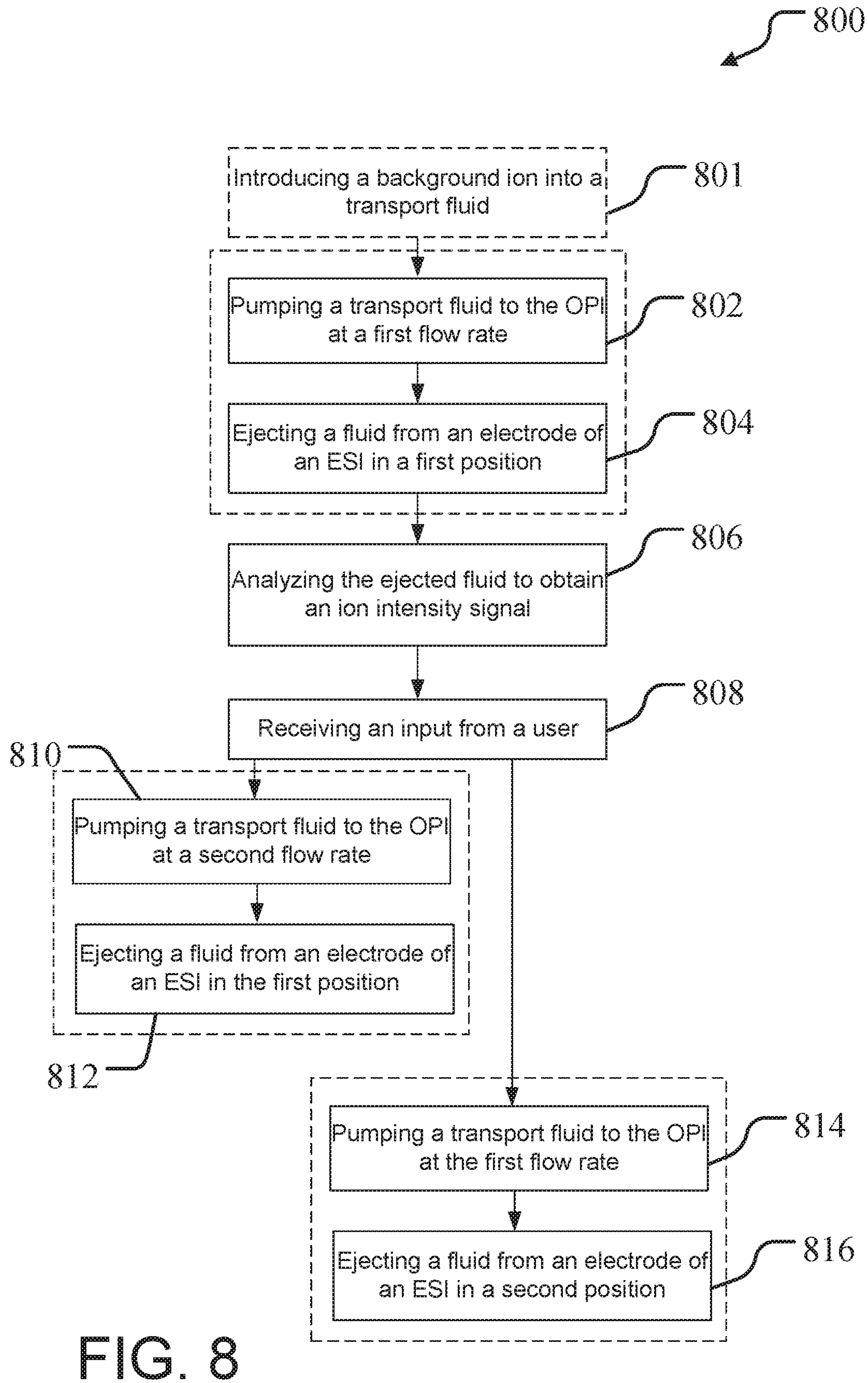
FIG. 8 depicts a method of controlling ejection of a liquid in a mass spectrometry device.

FIG. 8 depicts another method 800 of controlling ejection of a liquid in a mass spectrometry device. Prior to beginning the method 800, the position of an electrospray electrode within a nebulizer probe (e.g., as depicted in FIG. 2) is set to an initial position, for example as described elsewhere herein. In an optional beginning operation 801, a test liquid may be introduced to a transport liquid, for example at the reservoir depicted in FIG. 1, or along a flow path therefrom. The method 800 begins with pumping a transport fluid to the OPI at a first flow rate, operation 802. At substantially the same time (indicated by the dashed line in FIG. 8), operation 804, ejecting a fluid from the electrode of the ESI in the initial or first position in the probe is also performed. The liquid ejected from the ESI, which may be the transport fluid alone, or a transport fluid mixed with another fluid such as a liquid sample, may then be analyzed with the mass spectrometry device, operation 806, to obtain an ion intensity signal, which provides visual information to a technician or operator for adjustments that may be made to the mass spectrometry device to adjust flow between the OPI and the ESI. The results of the analysis, e.g., in the form of an ion intensity signal, may be displayed and evaluated by a technician or operator. Thereafter, the method receives an input from the technician or operator (a user), operation 808. The input may be a physical input, such as a change in position of an electrode (e.g., by rotating a ferrule of a housing), or a keyed input that may change the position. In other examples, a change in flow rate may be made by a physical or keyed input.

Depending on the input, the method 800 continues with pumping the transport liquid to the OPI at a second flow rate, operation 810, while simultaneously, ejecting a transport liquid from the electrode of the ESI in the first position in the probe, operation 812. In the alternative, the method 800 continues with pumping the transport liquid to the OPI at the first flow rate, operation 814, while simultaneously, ejecting a transport liquid from the electrode of the ESI in a second position in the probe, operation 816. The signals generated from valuating the ejected liquid may be further evaluated as described above, further adjustments may be made to the flow at the OPI or electrode position at the ESI, and so on, until a condition exists at maximum flow or optimum flow is achieved.

Figure 8A:
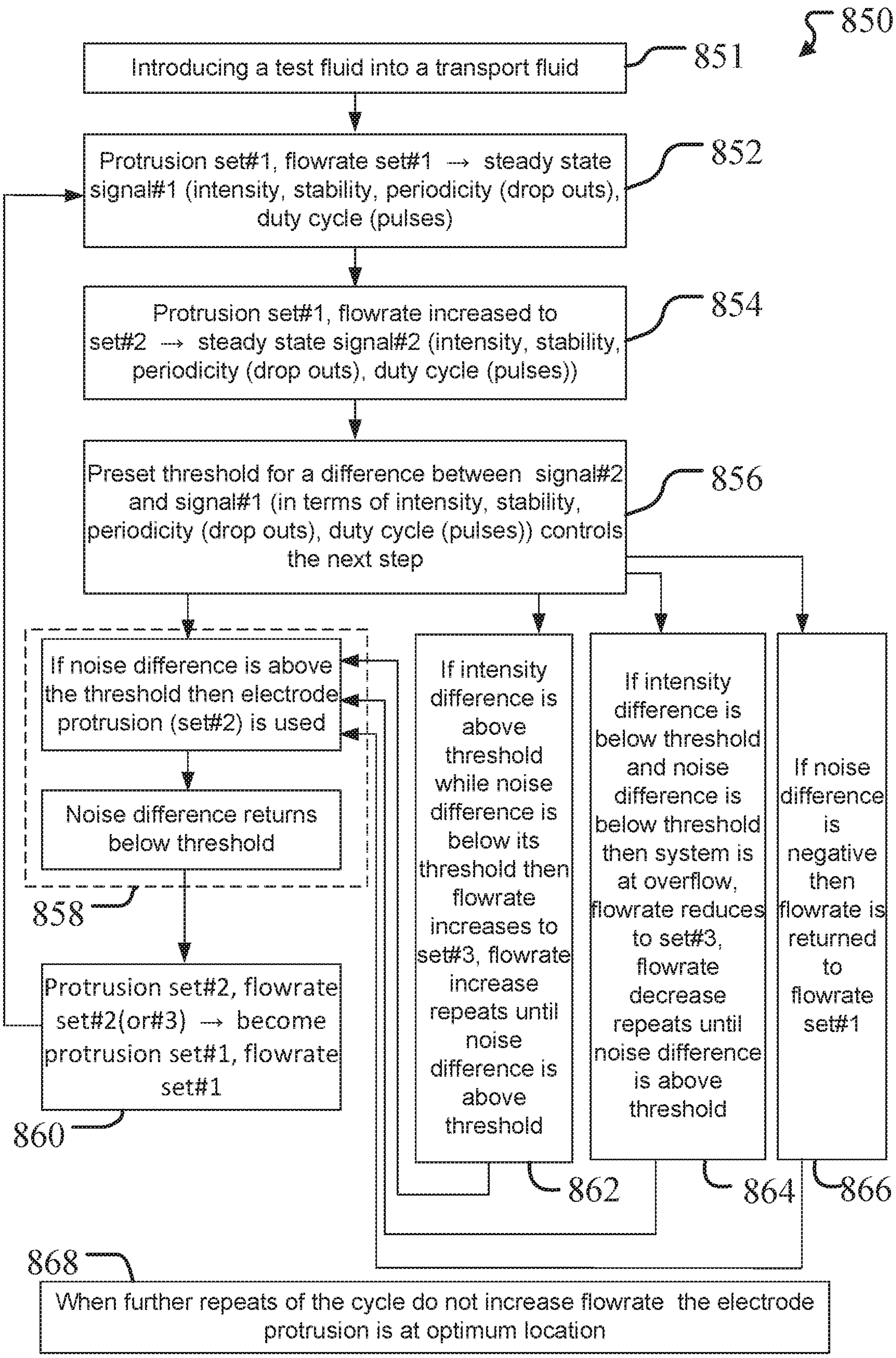
FIG. 8A depicts another method of controlling ejection of a liquid in a mass spectrometry device.

FIG. 8A depicts another method 850 of controlling ejection of a liquid in a mass spectrometry device which considers different starting points for the process. The different signal states discussed in the method 850 are based on (or illustrated by) FIG. 7D. In an optional beginning operation 851, a test liquid may be introduced to a transport liquid, for example at the reservoir depicted in FIG. 1, or along a flow path therefrom. The method 850 begins with setting the position of an electrospray electrode within a nebulizer probe (e.g., as depicted in FIG. 2) to a position 1 and with pumping a transport fluid to the OPI at a first flow rate, this represents the first half of operation 852. At substantially the same time ejecting a fluid from the electrode of the ESI in the initial or first position in the probe is also performed. The liquid ejected from the ESI, which may be the transport fluid alone, or a transport fluid mixed with another fluid such as a liquid sample, may then be analyzed with the mass spectrometry device to obtain an ion signal #1, the second part of operation 852. The results of the analysis, e.g., in the form of an ion intensity signal and its noise may be displayed and evaluated by a technician or operator. The process is then repeated at an increased flowrate, operation 854, generating ion signal #2. Thereafter, the difference between ion signal #2 and ion signal #1 in terms of intensity and noise level is evaluated whether it meets a given threshold, operation 856.

There are four possible outcomes from the operation 856. If the noise difference is above the given threshold, the electrode is moved to a new position, protrusion set #3 where the noise difference is again below the threshold, as shown in operation 858. As this is an iterative method, the method 850 returns to operation 852 via operation 860 in which the protrusion set #3 and flowrate set #2 are now called protrusion set #1 and flowrate set #1 respectively. Returning to operation 856, its other possible outcomes are now considered. If the noise difference is below threshold while the intensity difference is above its threshold then in operation 862 the flowrate is increased to flowrate set #3 where the noise difference has increased to above its threshold. With the noise difference above the threshold, the method 850 proceeds to operation 858 and its subsequent iterative steps. Again returning to operation 856, a third possible outcome is considered, when both intensity and noise difference threshold are not reached, the OPI system has reached an overflow state and in operation 864 the flowrate is decreased to flowrate set #3 where the noise difference has increased to above its threshold. With the noise difference above the threshold, the method 850 proceeds to operation 858 and its subsequent iterative operations. The fourth possible outcome of the operation 856, is a noise reduction at the increased flowrate set #2, shown in FIG. 8A as operation 866. This corresponds to flowrate set #2 being at the balanced/overflow regime. The threshold criterion is not met as the difference is now negative and triggers return to flowrate set #1 and the method 850 moves to operation 858. The electrode protrusion is then adjusted to set #2 where the absolute value of the noise difference is below the threshold. Method 850 is completed when further repeats do not yield an increase in the flowrate, operation 868. This indicates that the electrode protrusion is at the optimum distance from the nebulizer nozzle.

The four different outcomes from operation 856, correspond to the following starting points of the method 850, as illustrated by FIG. 7D. Operation 858 corresponds to initial electrode protrusion delivering signal such as illustrated by FIG. 7D, 1.8 to 2.4 min. Operation 862 corresponds to initial electrode protrusion delivering signal such as illustrated by FIG. 7D, 2.6 to 3.9 min. Operation 864 corresponds to initial electrode protrusion delivering signal such as illustrated by FIG. 7D, 0.0 to 0.6 min, balanced/overflow mode. Operation 866 corresponds to initial electrode protrusion delivering signal such as illustrated by FIG. 7D, 0.7 to 1.6 min, in-port oscillating liquid surface. The method 850 could also be started with initial electrode protrusion delivering signal such as illustrated by FIG. 7D, 4.0 to 4.9 min. In this case flowrate would be increased until a steady state signal intensity is attained.

Figure 9:
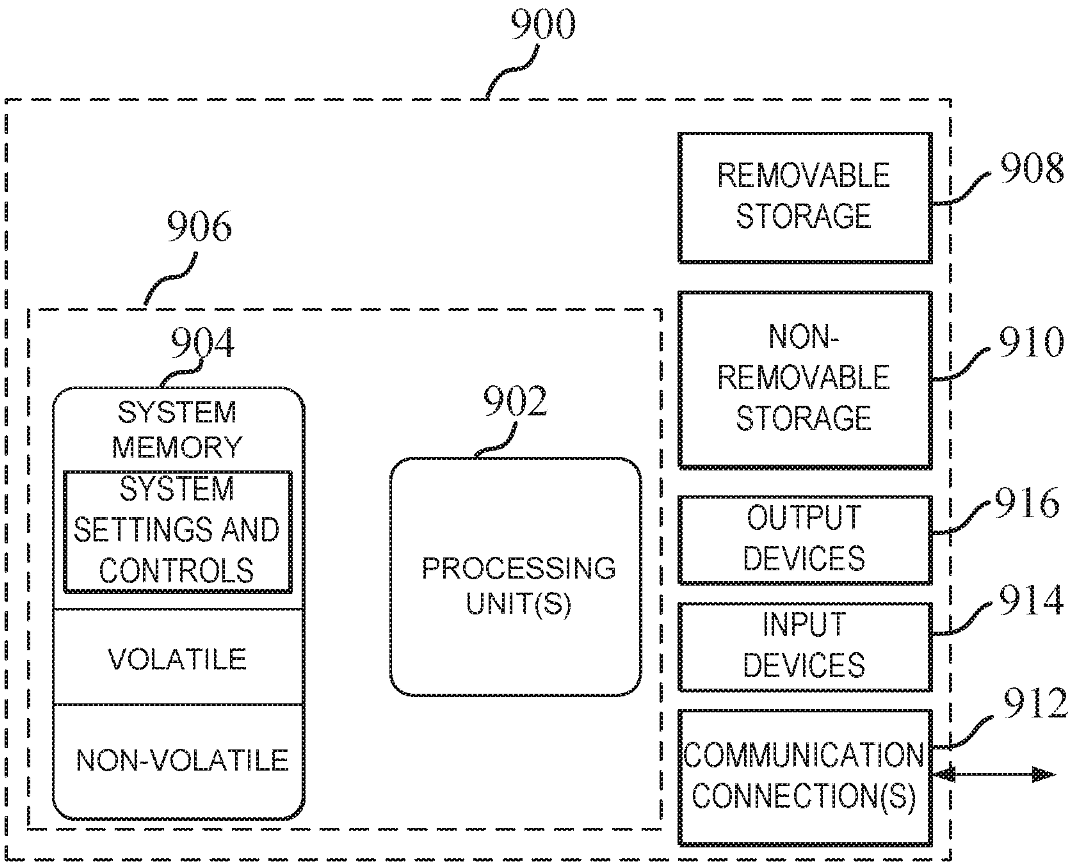
FIG. 9 depicts an example of a suitable operating environment in which one or more of the present examples can be implemented.

The method 850 can be initiated by setting the thresholds for the signal intensity difference and the associated noise difference. Other signal attributes could also be used, such as periodicity of the signal drops or signal pulse duration. Further, the method 850 could also be executed using absolute signal intensity or noise, alternatively or in conjunction with monitoring for general change in signal and its associated noise (as opposed to a set threshold). FIG. 9 depicts one example of a suitable operating environment 900 in which one or more of the present examples can be implemented. This operating environment may be incorporated directly into the controller for a mass spectrometry system, e.g., such as the controller depicted in FIG. 1. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like. In view of the portability of the processing systems described herein, a laptop or tablet computer may be desirably connected via a wired or wireless connection to a controller such as depicted in FIG. 1, and may send the appropriate control signals before, during, and after an electrode position-setting event, so as to control operation of the various components of the system.

In its most basic configuration, operating environment 900 typically includes at least one processing unit 902 and memory 904. Depending on the exact configuration and type of computing device, memory 904 (storing, among other things, instructions to control the transport liquid pump, sensors, valves, gas source, etc., or perform other methods disclosed herein) can be volatile (such as RAM), non-volatile (such as ROM, flash memory, etc.), or some combination of the two. This most basic configuration is illustrated in FIG. 9 by dashed line 906. Further, environment 900 can also include storage devices (removable, 908, and/or non-removable, 910) including, but not limited to, magnetic or optical disks or tape. Similarly, environment 900 can also have input device(s) 914 such as touch screens, keyboard, mouse, pen, voice input, etc., and/or output device (s) 916 such as a display, speakers, printer, etc. Also included in the environment can be one or more communication connections 912, such as LAN, WAN, point to point, Bluetooth, RF, etc.

Operating environment 900 typically includes at least some form of computer readable media. Computer readable media can be any available media that can be accessed by processing unit 902 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 900 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by computer system 900 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 900 is part of a network that stores data in remote storage media for use by the computer system 900.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method of adjusting a position of an electrode within a nebulizer probe of a mass spectrometry device having an open port interface for receiving a sample, the method comprising:

performing a first analysis at a first analysis condition comprising a first position of the electrode in the nebulizer probe and a first flow rate, wherein performing the first analysis comprises:

delivering a transport liquid to the open port interface at the first flow rate while ejecting a mixture comprising the sample and the transport fluid from the electrode in the first position; and analyzing the mixture at the first analysis condition with the mass spectrometry device to obtain a first analysis condition ion intensity signal;

after performing the first analysis, performing a second analysis at a second analysis condition comprising the first position of the electrode in the nebulizer probe and a second flow rate higher than the first flow rate, wherein performing the second analysis comprises:

delivering the transport liquid to the open port interface at the second flow rate while ejecting the mixture from the electrode in the first position; and analyzing the mixture at the second analysis condition with the mass spectrometry device to obtain a second analysis condition ion intensity signal; and after performing the second analysis, performing a third analysis at a third analysis condition comprising a second position of the electrode in the nebulizer probe and the second flow rate, wherein performing the third analysis comprises:

delivering the transport liquid to the open port interface at the second flow rate while ejecting the mixture from the electrode in the second position.

2. The method of claim 1, wherein performing the first analysis further comprises displaying the first analysis condition ion intensity signal, and wherein performing a second analysis further comprises displaying the second analysis condition ion intensity signal.

3. The method of claim 1, wherein performing the third analysis further comprises analyzing the mixture at the third analysis condition with the mass spectrometry device to obtain a third analysis condition ion intensity signal.

4. The method of claim 3, wherein performing the third analysis further comprises displaying the third analysis condition ion intensity signal.

5. The method of claim 1, wherein the first analysis condition ion intensity signal is characterized by at least one of peak height, a peak width, a baseline at least two adjacent peaks, a peak-to-peak variation, and a peak shape.

6. The method of claim 1, further comprising:

detecting a deviation by a first predetermined threshold between the first analysis condition ion intensity signal and the second analysis condition ion intensity signal; and sending an electrode adjustment signal based at least in part on the deviation.

7. The method of claim 6, wherein sending the electrode adjustment signal comprises:

initiating an adjustment of the position of the electrode within the nebulizer probe;

detecting a reduced deviation of less than the first predetermined threshold between the first analysis condition ion intensity signal and the second analysis condition ion intensity signal; and terminating adjustment of the position of the electrode within the nebulizer probe based at least in part on the detection of the reduced deviation, wherein the position of the electrode within the nebulizer probe at the termination of adjustment of the position of the electrode is the second position.

8. The method of claim 6, wherein sending the electrode adjustment signal comprises emitting at least one of a visual signal and an audible signal.

9. A method of adjusting a position of an electrode within a nebulizer probe of a mass spectrometry device having an open port interface for receiving a transport liquid, the method comprising:

delivering a transport liquid to the open port interface at a first flow rate while ejecting the transport liquid from the electrode in a first position relative to the nebulizer probe;

analyzing the ejected transport liquid with the mass spectrometry device to generate an analysis signal comprising a test compound intensity signal and an associated noise; and after generation of the test compound intensity signal, delivering the transport liquid to the open port interface at the first flow rate while ejecting the transport liquid from the electrode in a second position relative to the nebulizer probe, wherein delivering the transport liquid to the open port interface at the first flow rate substantially eliminates the noise from the test compound intensity signal.

10. The method of claim 9, further comprising:

after substantially eliminating the noise from the analysis signal, delivering the transport liquid to the open port interface at a higher second flow rate while ejecting the transport liquid from the electrode in the second position relative to the nebulizer probe, wherein delivering the transport liquid to the open port interface at the second flow rate introduces noise to the analysis signal; and after generation of the test compound intensity signal, delivering the transport liquid to the open port interface at the second flow rate while ejecting the transport liquid from the electrode in a third position relative to the nebulizer probe, wherein delivering the transport liquid to the open port interface at the second flow rate substantially eliminates the noise from the test compound intensity signal.

11. The method of claim 9, wherein the test compound intensity signal is characterized by at least one of an intensity, a noise, a signal event periodicity, and a signal event duration.

12. The method of claim 9, further comprising detecting a deviation by a first predetermined threshold between the test compound intensity signal and the noise.

13. The method of claim 12, further comprising sending an electrode adjustment signal based at least in part on the detection.

14. The method of claim 13, wherein sending the electrode adjustment signal initiates an adjustment of a position of the electrode within the nebulizer probe.

15. The method of claim 13, wherein sending the electrode adjustment signal comprises emitting at least one of a visual signal and an audible signal.

16. The method of claim 9, wherein when in the first position, an indexing feature on the nebulizer probe is in a first positioning configuration and wherein when in the second position, the indexing feature on the nebulizer probe is in a second positioning configuration.

17. A mass analysis instrument comprising:

an open port interface (OPI) configured to receive a sample;

a liquid pump configured to pump a transport liquid into the OPI;

an electrospray ionization (ESI) source, in liquid communication with the OPI, including an electrode within a nebulizer probe, wherein the electrode is movably positionable within the probe;

a detector configured to detect ions emitted from the ESI source;

a processor; and memory storing instructions that when executed by the processor cause the mass analysis instrument to perform a set of operations comprising:

pumping the transport liquid into the OPI at a first flow rate;

during pumping at the first flow rate, with the electrode positioned at a first position, ejecting at least one of the transport liquid and the sample through the ESI source to be analyzed by the detector;

analyzing the ejected at least one of the transport liquid and the sample to obtain a ion intensity signal;

displaying the ion intensity signal;

receiving an input from a user; and based at least in part on the input, performing at least one of:

pumping the transport liquid into the OPI at a second flow rate while ejecting at least one of the transport liquid and the sample through the ESI source with the electrode in the first position; and pumping the transport liquid into the OPI at the first flow rate while ejecting at least one of the transport liquid and the sample through the ESI source with the electrode in a second position.

18. The mass analysis instrument of claim 17, wherein the ion intensity signal is associated with the sample.

19. The mass analysis instrument of claim 17, wherein the ion intensity signal is associated with the transport liquid.

20. The mass analysis instrument of claim 17, further comprising a transport liquid source and test liquid interface communicatively coupled to the transport liquid source.

21. The mass analysis instrument of claim 17, wherein the set of operations further comprises introducing the sample to the transport liquid.

* * * * *